United States Patent
Takahashi et al.

(10) Patent No.: US 7,198,568 B2
(45) Date of Patent: Apr. 3, 2007

(54) GAME MACHINE AND GAME PROGRAM FOR CHANGING THE MOVEMENT OF ONE CHARACTER BASED ON THE MOVEMENT OF ANOTHER CHARACTER

(75) Inventors: Shinya Takahashi, Kyoto (JP); Kenji Yamamoto, Kyoto (JP); Kiyoshi Mizuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 393 days.

(21) Appl. No.: 10/288,535

(22) Filed: Nov. 6, 2002

(65) Prior Publication Data

US 2003/0207704 A1 Nov. 6, 2003

(30) Foreign Application Priority Data

May 1, 2002 (JP) .............................. 2002-129935
May 1, 2002 (JP) .............................. 2002-129936

(51) Int. Cl.
*A63F 9/24* (2006.01)
*A63F 13/00* (2006.01)
*G06F 17/00* (2006.01)

(52) U.S. Cl. ....................... 463/1; 463/3; 463/6; 463/7; 463/8

(58) Field of Classification Search .................... 463/1, 463/3, 6, 7, 8, 43; 345/473–475
See application file for complete search history.

(56) References Cited

U.S. PATENT DOCUMENTS 5,358,259 A * 10/1994 Best .............................. 463/31
5,649,862 A * 7/1997 Sakaguchi et al. ............. 463/44
6,095,920 A * 8/2000 Sadahiro ......................... 463/2
6,200,138 B1 * 3/2001 Ando et al. ................... 434/61

(Continued)

FOREIGN PATENT DOCUMENTS

GB 1589647 5/1981

(Continued)

OTHER PUBLICATIONS

"Halo: Combat Evolved" retrieved from http://www.xbox.com/en-us/halo/default.htm?level1=enusgames&level2=catalog &level3=halo on Aug. 24, 2005, pp. 1-3.*

(Continued)

*Primary Examiner*—Robert Olszewski
*Assistant Examiner*—Sunit Pandya
(74) *Attorney, Agent, or Firm*—Nixon & Vanderhye, P.C.

(57) ABSTRACT

An image processing mechanism of a game apparatus includes a first motion control mechanism and a second motion control mechanism. The first motion control mechanism controls the motion of a first character appearing in a game space in response to an operation performed on a first operation switch included in a plurality of operation switches. The second motion control mechanism controls the motion of a second character also appearing in the game space but different from the first character in response to an operation performed on a second operation switch, and changes the motion of the first character based on the motion of the second character. Thus, the present game apparatus makes a relationship between a player and subjects of operation involved, thereby allowing the player to experience a novel sensation in playing a game.

36 Claims, 16 Drawing Sheets

U.S. PATENT DOCUMENTS

| | | | |
|---|---|---|---|
| 6,222,546 | B1 | 4/2001 | Yokoyama et al. |
| 6,319,121 | B1* | 11/2001 | Yamada et al. ............... 463/8 |
| 6,354,940 | B1* | 3/2002 | Itou et al. ..................... 463/8 |
| 6,488,586 | B1* | 12/2002 | Kobayashi et al. ........... 463/43 |
| 6,731,278 | B2 | 5/2004 | Yokoyama et al. |
| 2001/0029201 | A1 | 10/2001 | Minami |
| 2001/0040586 | A1 | 11/2001 | Yokoyama et al. |
| 2002/0119811 | A1* | 8/2002 | Yabe et al. ................... 463/8 |
| 2003/0006982 | A1 | 1/2003 | Yokoyama et al. |

FOREIGN PATENT DOCUMENTS

| | | |
|---|---|---|
| JP | 54-40744 | 3/1979 |
| JP | 10-021425 | 1/1998 |
| JP | 2000-107448 | 4/2000 |
| JP | 2000-149059 | 5/2000 |
| JP | 2000-342855 | 12/2000 |
| JP | 2001-190833 | 7/2001 |
| JP | 2001-276432 | 10/2001 |
| JP | 2001-300143 | 10/2001 |
| WO | WO 93/16776 | 9/1993 |

OTHER PUBLICATIONS

"Halo Review" retrieved from http://www.gamespot.com/xbox/action/halo/printable_2823816.html on Aug. 16, 2005, pp. 1-4.*

"Halo (Xbox)" retrieved from http://games.teamxbox.com/xbox/55/Halo on Aug. 24, 2005, pp. 1-8.*

Al-Shakarchi, "Bungie Software's most ambitious game project to date pits man against alien on a strange ring-shaped world", retrieved from http://halo.bungie.org/pressscans/display.html?scan=macformat.0999 on Aug. 17, 2005, pp. 1-3.*

"Halo: Combat Evolved Reader Review" retreived from http://gamefaqs.com/console/xbox/review/R26258.html on Aug. 16, 2005, pp. 1-3.*

Screenshot from Halo: Combat Evolved retrieved from http://xbox.com/media/games/halo/sim-halo-0011.jpg on Aug. 16, 2005, 1 page.*

Halo: Combat Evolved game manual, published 2001, pp. 1-16.*

"List of Vehicles in the Halo universe" retrieved from http://en.wikipedia.org/wiki/List_of_vehicles_in_the_Halo_universe on Aug. 16, 2005, pp. 1-7.*

Examiner's Affidavit by Jason Skaarup, dated Aug. 23, 2005, pp. 1-2.*

Double Dragon Videogame Description and Screenshots from http://www.abandonia.com/games/330/Double_Dragon; 1988.

Street Fighter 2 Videogame Description and Screenshots from http://www.abandonia.com/games/244/Street_Fighter_2; 1992.

Street Fighter 2 Videogame Screenshots from http://media.psx.ign.com/media/003/003863/imgs_1.html; 1998.

NCAA GameBreaker 2001 Videogame Description and Screenshots from http://psx.ign.com/articles/135/135028p1.html; 2000.

The Daytona USA 2001 Videogame Description and Screenshots from http://www.gamekult.com; 2000.

The computer game "Combo Racer", © 1990 by Gremlin Graphics, Akktueller software markt, ASM Sep. 1990, Hans-Joachim Amann "ECHT ABGEFAHR'N!", review "Combo Racer"; 2 pages. www.classicgaming.com/amigareviews/comborac.htm.

The computer game "The Goonies", © 1985 by Datasoft, U.S. Gold, Backcover of "The Goonies" game-box.

Happy Computer Mar. 1986, Heinrich Lenhardt.

"Combo Racer", review in Amiga Joker, Apr. 1990, 3 pages (1 pg in German, 2 pgs English translation).

Thomas Mitchell, Instruction Booklet for the game "Oil's Well", Sierra Online, 1983, 4 pages.

Instruction Booklet for the game "Smash TV", Acclaim entertainment, Inc., 1991, 10 pages.

* cited by examiner

Fig. 4

|  | FIRST BIT | SECOND BIT | THIRD BIT | FOURTH BIT | FIFTH BIT | SIXTH BIT | SEVENTH BIT | EIGHTH BIT |
|---|---|---|---|---|---|---|---|---|
| FIRST BYTE | Z BUTTON | R BUTTON | L BUTTON | A BUTTON | B BUTTON | X BUTTON | Y BUTTON | START BUTTON |
| SECOND BYTE | LEFT CROSS KEY | RIGHT CROSS KEY | LOWER CROSS KEY | UPPER CROSS KEY | 0 | 0 | 0 | 0 |
| THIRD BYTE | MAIN ANALOG STICK X-AXIS DATA ||||||||
| FOURTH BYTE | MAIN ANALOG STICK Y-AXIS DATA ||||||||
| FIFTH BYTE | SUB-ANALOG STICK X-AXIS DATA ||||||||
| SIXTH BYTE | SUB-ANALOG STICK Y-AXIS DATA ||||||||
| SEVENTH BYTE | ANALOG DATA INDICATING PRESSURE EXERTED ON R BUTTON |||| ANALOG DATA INDICATING PRESSURE EXERTED ON L BUTTON ||||

4

Fig. 8
STATE (a) FRONT:B BACK:A
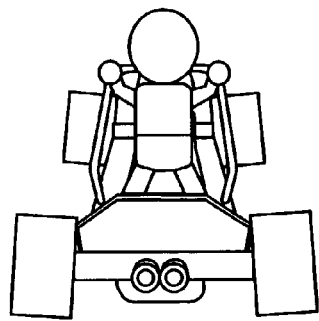
STATE (b)
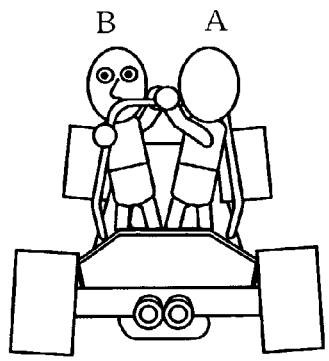
STATE (c)
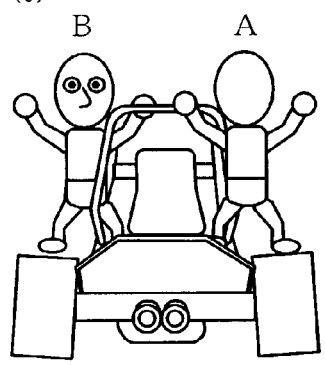
STATE (d)
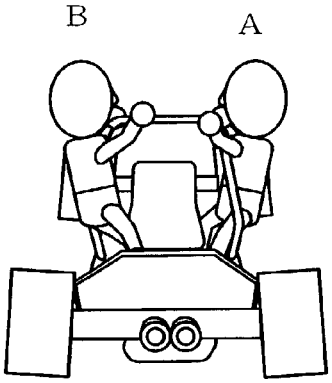
STATE (e) FRONT:A BACK:B
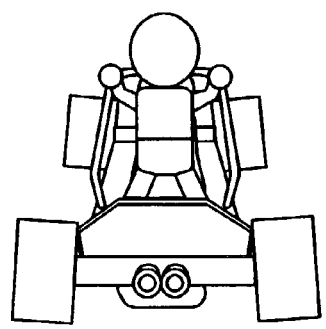

GAME MACHINE AND GAME PROGRAM FOR CHANGING THE MOVEMENT OF ONE CHARACTER BASED ON THE MOVEMENT OF ANOTHER CHARACTER

BACKGROUND

1. Technical Field

The technology described herein relates to game machines, more specifically, game machines used by a player to operate characters displayed on a screen.

2. Description of the Background Art

In conventional race games or action games, one player generally operates one character. For example, in conventional race games, one player operates one vehicle (that is, one driver) to race. To play such conventional games, each player is required to have a one-to-one relationship with his/her subject of operation (character), which can at times hinder players from fully enjoying the features of the game. In conventional games, for example, it is not possible for one player to operate a plurality of characters. Also, it is not possible for a plurality of players to cooperate in operating one character.

Therefore, to make games more interesting, for example, the following technique for enabling one player to operate a plurality of characters, as disclosed in Japanese Patent Laid-Open Publication No. 2001-300143 was devised. Such a technique suspends or slows down the progress of a game to allow the player to operate two and more characters. As a result, the player can operate a plurality of characters without any difficulty.

Furthermore, a technique for enabling two players to cooperate in operating one character is disclosed in Japanese Patent Laid-Open Publication No. 2000-342855. Such a technique generates a combined character into which two characters operated by two respective players are combined, thereby allowing the two players to cooperate in operating the combined character.

In both inventions as described above, however, players do not fully enjoy the features of the game resultant from such an involved relationship between players and their subjects of operation. That is, in the technique disclosed in Japanese Patent Laid-Open Publication No. 2001-300143, one player can operate a plurality of characters, but cannot operate them at the same time. Therefore, players cannot experience a novel sensation in playing the game by operating a plurality of characters at the same time.

In RPG games, one player conventionally operates a plurality of characters. However, in such conventional RPG games, the player only operates a plurality of characters by turns, and cannot operate a plurality of characters at the same time. Therefore, similar to the invention disclosed in the above-described gazette (Japanese Patent Laid-Open Publication No. 2001-300143), in the conventional RPG games, players do not fully enjoy the features of the game in which a plurality of characters are operated.

Also, in the technique disclosed in Japanese Patent Laid-Open Publication No. 2000-342855, operations each assigned to two players are reflected independently on the motion of a single combined character. In response, the combined character makes motions (for example, attack and move) corresponding to the respective operations. As such, in the technique described above, different operations performed by two players are not connected with each other, which hinders the players from fully enjoying the game by cooperating in operating one character.

SUMMARY OF EXEMPLARY NON-LIMITING EMBODIMENTS

Therefore, an aspect of a present exemplary non-limiting embodiment is to provide a game machine that provides a more involved relationship between a player and their subjects of operation, thereby allowing the player to experience a novel sensation while playing a game.

A first aspect of a present exemplary non-limiting embodiment is directed to a game machine for operating a plurality of characters appearing in a game space. The game machine includes a plurality of operation switches (corresponding to operation switches 301 to 311 in an embodiment described further below) and image processing means (CPU 202 or/and GPU 204 executing steps S104 to S111; hereinafter, only step numbers are shown). The operation switches are operated by game players. The image processing means executes a game program in response to an operation performed on the operation switches, thereby generating a game image including image data of the characters. Here, the image processing means includes first motion control means (step S302) and second motion control means (step S303). The first motion control means controls the motion of a first character (movable character 601 and driver character 602) appearing in the game space in response to an operation performed on a first operation switch (main analog stick 310) included in the operation switches. The second motion control means controls the motion of a second character (passenger character 603) also appearing in the game space but different from the first character in response to an operation performed on the second operation switch (R button and L button) included in the operation switches, and changes the motion of the first character based on the motion of the second character.

Thus, each character (first and second characters) is operated by two types of operations, that is, the first character is operated by the first operation switch and the second character is operated by the second operation switch. Furthermore, an operation performed on one character (second character) is reflected on an operation performed on the other character (first character). As a result, the relationship between the players and subjects of operations becomes involved, thereby allowing the players to experience a novel sensation in playing the game.

Here, the first and the second operation switches may be provided in a single controller (controller 104) operated by one player. As a result, the two types of operations are performed by one player, which allows the player to operate the two characters. Therefore, the player can experience a novel sensation in playing the game by operating the two characters at the same time. Note that it becomes very difficult to operate the game by allowing the player to operate a plurality of characters at the same time, because the player is required to pay attention to the characters at the same time. Here, according to the present aspect, the motion of the first character changes in accordance with the motion of the second character. Therefore, the motions of the first and second characters are connected with each other, and each motion is not altogether independent. Thus, the player is required to pay attention only in operating the first character. That is, the player operates the second character at the same time while carefully operating the first character. As such, the player can not only experience a novel sensation in playing the game by operating the plurality of characters at the same time, but also operate the characters with no difficulty.

Furthermore, the first operation switch may be provided in a first controller (controller 104), and the second operation switch may be provided in a second controller (controller 105). In this case, the first and second controllers are each operated by different players, that is, the second controller is operated by a player who is different from the player operating the first controller. Thus, the two types of operations are performed by each of the two players, that is, the two players operate the first character together. Therefore, the players can enjoy cooperating in operating one character (first character), and experience a novel sensation in playing the game.

Note that each of the first and second characters is not necessarily restricted to one human-like character or non-human subject. That is, each of the first and second characters may be a character including a plurality of human-like characters or non-human subjects. For example, the first character may be a character including a kart and one or more human-like characters riding thereupon.

Still further, preferably, when the motion of the second character is instructed by the second operation switch while the first character is operated by the first operation switch, the second motion control means further changes the motion of the first character.

Furthermore, preferably, the image processing means collectively displays a movable character traveling in the game space and a driver character driving the movable character as the first character, and displays a fellow passenger character riding on the movable character as the second character. The movable character is a character traveling in the game space. The driver character is a character driving the movable character. The fellow passenger character is a character riding on the movable character. Here, the first motion control means controls the motions of the driver character and the movable character. Furthermore, the second motion control means controls the motion of the fellow passenger character, and changes the motion of the movable character based on the motion of the fellow passenger character. According to the present aspect, the first character is a character including two characters, that is, the movable character and the driver character riding thereon. Therefore, the players can experience a novel sensation in playing the game by operating the two characters (driver character and fellow passenger character) at the same time thereby further operating another character (movable character).

Furthermore, the first motion control means may change the traveling direction of the movable character. In this case, the second motion control means makes the fellow passenger character apply its weight on the movable character, and changes the traveling direction of the movable character based on the direction in which the fellow passenger character applies its weight.

Still further, the first motion control means may change the traveling direction of the movable character, and make the driver character operate the movable character.

Furthermore, the image processing means may further include character change means (step S105). The character change means changes the roles of characters set as the driver character and the fellow passenger character in response to an operation performed on a third operation switch (Z button 301) included in the operation switches.

Furthermore, the second motion control means changes the degree to which the motion of the movable character is changed based on the motion of the fellow passenger character in accordance with unique characteristics predetermined for the driver character and the fellow passenger character.

Still further, when the first operation switch is provided in a first controller, and the second operation switch is provided in a second controller, the image processing means may further include character change means (step S105). In this case, the character change means changes the roles of the characters set as the driver character and the fellow passenger character in response to an operation performed on a third operation switch (Z button 301) provided in the first and/or second controller.

Furthermore, when roles of the characters set as the driver character and the fellow passenger character are changed with each other by the character change means, the first motion control means, may change settings so as to control the motion of the first character in response to an operation performed on the second operation switch instead of an operation performed on the first operation switch. In this case, when roles of the characters set as the driver character and the fellow passenger character are changed with each other by the character change means, the second motion control means, controls the motion of the second character in response to an operation performed on the first operation switch instead of an operation performed on the second operation switch, and changes the motion of the first character.

A second aspect of a present exemplary non-limiting embodiment is directed to a computer-readable recording medium storing a program, wherein a computer included in a game machine operating a plurality of characters that appears in a game space is instructed to execute in response to the operation of a controller performed by a player, an operation instruction receiving step (step S103) and an image processing step (steps S104 to S111). In the operation instruction receiving step, operation data including a plurality of types of game operation instructions inputted by the player is received from a controller. In the image processing step, a game image including image data of a plurality of characters is generated in response to the operation data. Furthermore, the image processing step includes a first motion control step (step S302) and a second motion control step (step S303). In the first motion control step, the motion of a first character appearing in the game space is controlled in response to a first operation instruction inputted by the player. In the second motion control step, the motion of a second character also appearing in the game space but different from the first character is controlled, and the motion of the first character is changed based on the motion of the second character.

Here, in the operation instruction receiving step, operation data may be received from a single controller operated by one player.

Furthermore, in the operation instruction receiving step, first operation data including the first operation instruction may be received from a first controller, and second operation data including the second operation instruction may be received from a second controller. In this case, the first and second controllers are each operated by different players, that is, the second controller is operated by a player who is different from the player operating the first controller. Furthermore, the first operation data includes a first operation instruction, and the second operation data includes a second operation instruction.

Still further, preferably, in the second motion control step, the motion of the first character is further changed when the motion of the second character is instructed by the second operation instruction while the first character is operated by the first operation instruction.

Furthermore, preferably, in the image processing step, a movable character traveling in the game space and a driver character driving the movable character are collectively displayed as the first character, and a fellow passenger character riding on the movable character is displayed as the second character. In this case, in the first motion control step, the motions of the driver character and the movable character are changed. Furthermore, in the second motion control step, the motion of the fellow passenger character is changed, and the motion of the movable character is also changed based on the motion of the fellow passenger character.

Furthermore, in the first motion control step, the direction of the movable character may be changed. In this case, in the second motion control step, the fellow passenger character is operated so as to apply its weight on the movable character, and the traveling direction of the movable character is changed based on the direction in which the fellow passenger character applies its weight.

Still further, in the first motion control step, the traveling direction of the movable character may be changed, and the driver character may be made to operate the movable character.

Furthermore, the image processing step may further include a character change step (step S105). In the character change step, roles of the characters set as the driver character and the fellow passenger character are changed with each other in response to a third operation instruction included in the operation data.

Still further, in the second motion control step, the degree to which the motion of the movable character may be changed based on the motion of the fellow passenger character in accordance with unique characteristics predetermined for the driver character and the fellow passenger character.

Furthermore, when first operation data including the first operation instruction is received from a first controller, and second operation data including the second operation instruction is received from a second controller in the operation instruction receiving step, the image processing step may further include a character change step (step S105). In the image processing step, roles of characters set as the driver character and the fellow passenger character are changed with each other based on the first and/or second operation data.

Still further, in the first motion control step, when roles of the characters set as the driver character and the fellow passenger character are changed with each other, the motion of the first character may be controlled by the second operation data instead of the first operation data. In this case, in the second motion control step, when roles of the characters set as the driver character and the fellow passenger character are changed with each other by the character change means, the motion of the second character is controlled by the first operation data instead of the second operation data, and the motion of the first character is changed.

These and other features, aspects and advantages of a present exemplary non-limiting embodiment will become more apparent from the following detailed description of a present exemplary non-limiting embodiment when taken in conjunction with the accompanying drawings.

BRIEF DESCRIPTION OF THE DRAWINGS

FIG. 4 is an illustration showing the structure of operation data generated in a controller 104 shown in FIG. 1.

FIG. 8 is an illustration showing an example of an animated cartoon displayed while character change processing shown in step S105 of FIG. 7 is carried out.

DESCRIPTION OF THE PREFERRED EMBODIMENTS

Figure 1:
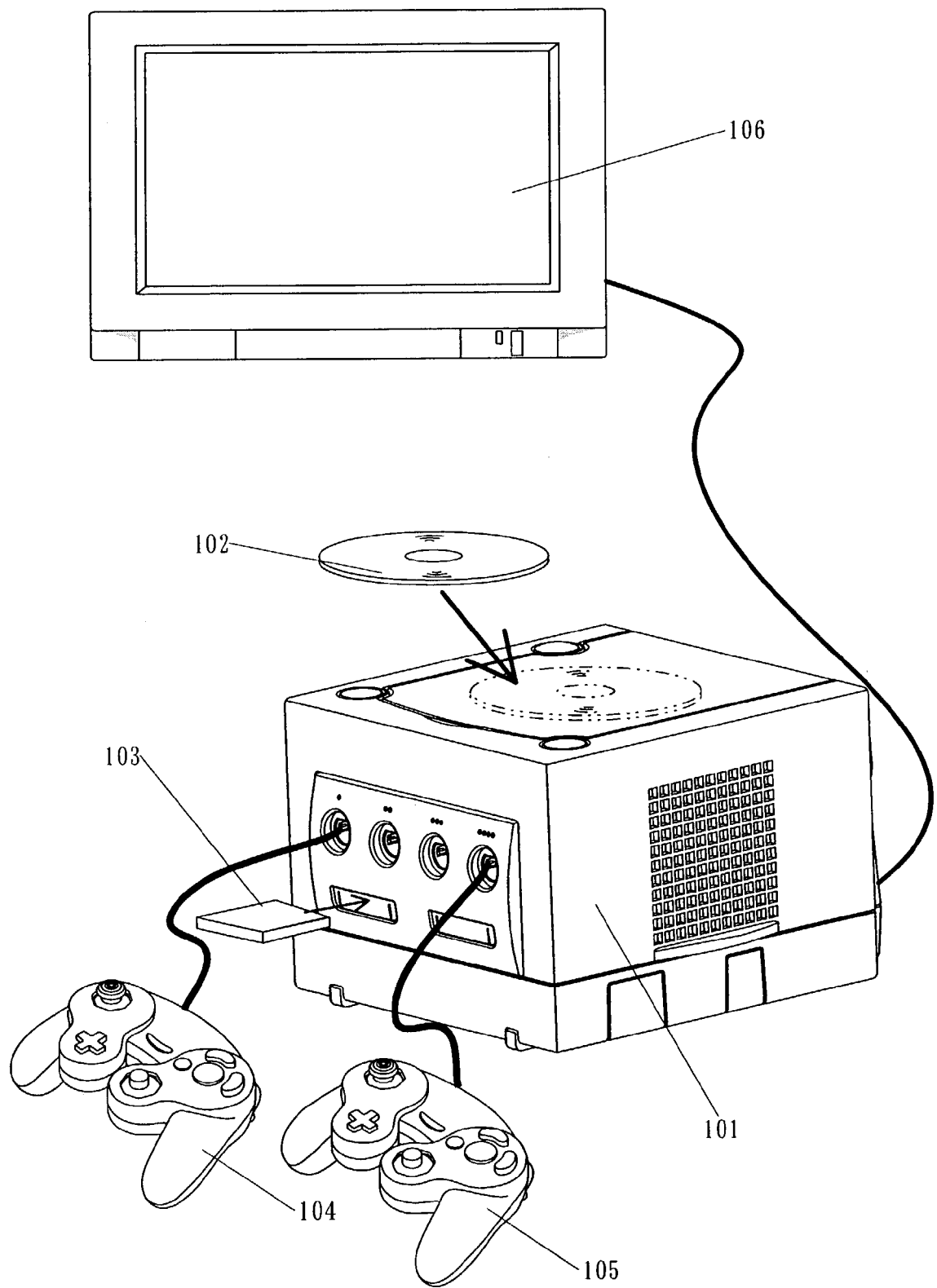
FIG. 1 is an external view of a game system according to an embodiment of a present exemplary non-limiting embodiment.
Figure 2:
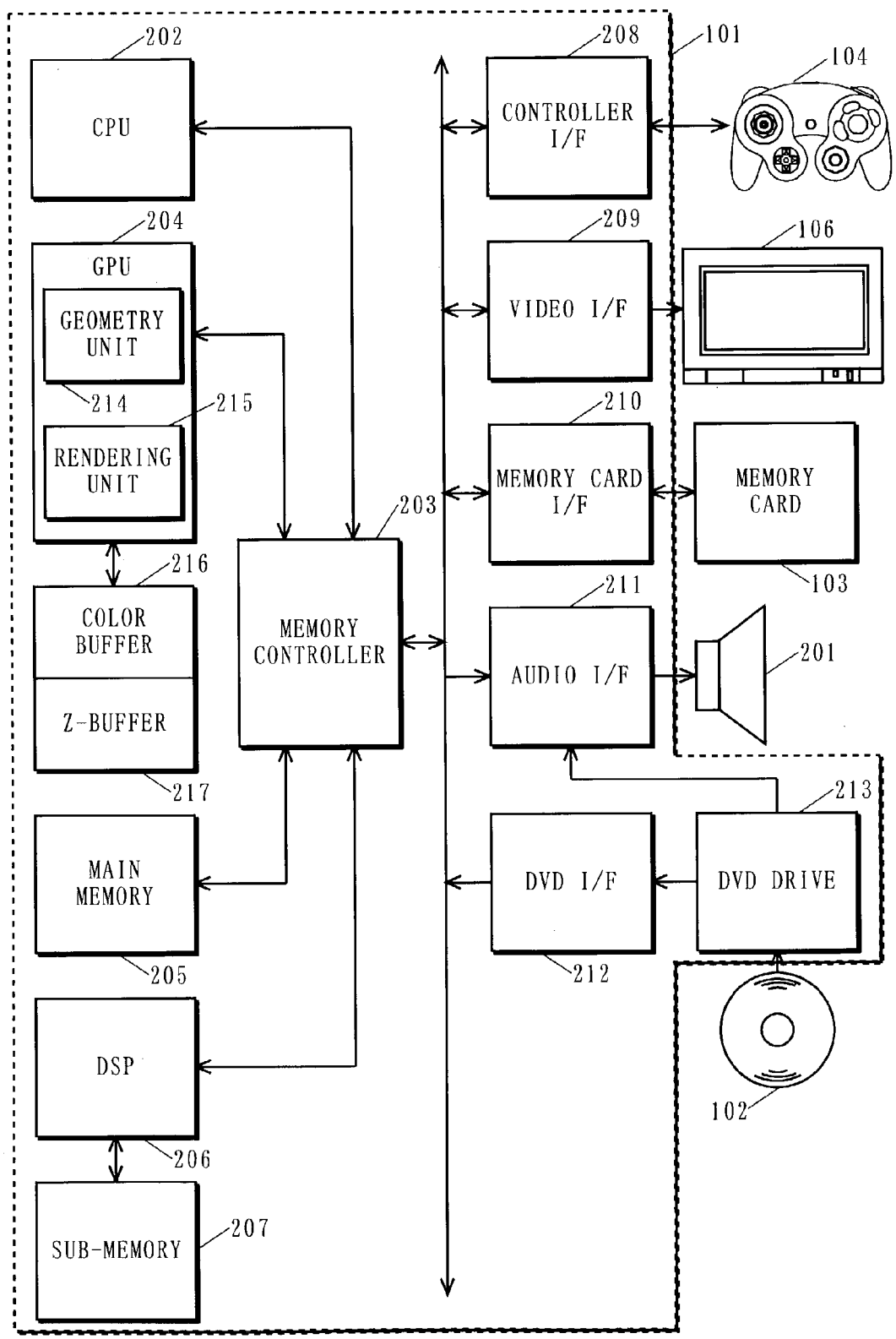
FIG. 2 is a diagram showing the configuration of hardware of a game system of the present embodiment.

FIG. 1 is an external view of a game system according to an embodiment of a present exemplary non-limiting embodiment, and FIG. 2 is a block diagram of the configuration of the game system. As shown in FIGS. 1 and 2, the game system includes a game machine body 101, a DVD-ROM 102, a memory card 103, controllers 104 and 105 (in FIG. 2, only a controller 104 is shown), a speaker 201, and a television 106. The DVD-ROM 102 and the memory card 103 are removably mounted on or inserted into the game machine body 101, respectively. The controllers 104 and 105 are respectively connected to any of a plurality of (four in FIG. 1) controller port connectors provided for the game machine body 101. Furthermore, the television 106 and the speaker 201 are connected to the game machine body 101 by an AV cable, etc. Note that, in another embodiment, communications between the game machine body 101 and the controllers 104 and 105 may be carried out by radio communications without using a communications cable. Described below are details of each part of the game system according to a present exemplary non-limiting embodiment. Described next are general operations performed in the game system.

The DVD-ROM 102, which is an exemplarily external recording medium, fixedly stores a game program or game data such as character data. The DVD-ROM 102 is mounted on the game machine body 101 when a player plays a game. Note that the means for storing a game program, etc., is not restricted to the DVD-ROM 102, and that a recording medium such as a CD-ROM, an MO, a memory card, and a ROM cartridge, etc., may be used. The memory card 103 is composed of a rewritable recording medium such as flash memory, and stores data, for example, which has been saved during the game or at the end of the game.

The game machine body 101 reads the game program stored in the DVD-ROM 102 to start game processing. The configuration of the game machine body 101 and details of the game processing are described below. The controllers 104 and 105 are input devices, into which players input information required for operating the game, each having a plurality of operation switches. Note that, when one player plays the game, one controller may be enough. The controllers 104 and 105 output operation data to the game machine body 101 in response to, for example, the pressure of the operation switches exerted by the players. The television 106 displays image data outputted from the game machine body 101. The speaker 201 is typically incorporated into the television 106, and produces game sound outputted from the game machine body 101.

The configuration of the game machine body 101 is described next. In FIG. 2, a CPU 202 and a memory controller 203 connected thereto are incorporated in the game machine body 101. Furthermore, in the game machine body 101, the memory controller 203 is connected to a graphics processing unit (GPU) 204, main memory 205, sub-memory 207 via a DSP 206, and various types of interfaces (IF) 208 to 211. The memory controller 203 controls data transfer between these components.

To start the game, the DVD drive 213 first starts the DVD-ROM 102 mounted on the game machine body 101. The game program stored in the DVD-ROM 102 is read into the main memory 205 via the DVD I/F 212 and the memory controller 203. The program on the main memory 205 is executed by the CPU 202 to start the game. After the game is started, the players use operation switches to input operation instructions, etc., for the controllers 104 and 105. In response to the operation instructions inputted by the players, the controllers 104 and 105 output operation data to the game machine body 101. Here, the operation data outputted from the controller 104 is referred to as first operation data, and the operation data outputted from the controller 105 is referred to as second operation data. The first and second operation data are inputted into the CPU 202 via the controller I/F 208 and the memory controller 203. In response to the inputted operation data, the CPU 202 carries out game processing. The GPU 204 and the DSP 206 are used when, for example, image data is generated in the game processing.

Furthermore, the sub-memory 207 is used when the DSP 206 carries out a predetermined processing.

The GPU 204, which includes a geometry unit 214 and a rendering unit 215, is connected to memory dedicated to image processing. The memory dedicated to image processing is used, for example, as a color buffer 216 and a Z-buffer 217. The geometry unit 214 carries out calculations on coordinates of a three-dimensional model (for example, a subject constructed of a plurality of polygons) of a subject or a graphics placed in a virtual three-dimensional game space. For example, the geometry unit 214 performs rotation, scaling, and change in shape of the three-dimensional model, or carries out coordinate transformation from a world coordinate system into a viewpoint coordinate system or a screen coordinate system. The rendering unit 215 writes, based on a predetermined texture, color data (RGB data) of each pixel of the three-dimensional model reflected onto a screen coordinates into the color buffer 216 to generate a game image. Furthermore, the color buffer 216 is a memory area reserved for holding the game image data (RGB data) generated by the rendering unit 215. The Z-buffer 217 is a memory area reserved for holding information on depth from a viewpoint that is to be lost when the coordinates are transformed from three-dimensional viewpoint coordinates into two-dimensional screen coordinates. The GPU 204 uses these units to generate image data to be displayed on the television 106, and outputs the image data to the television 106 as required via the memory controller 203 and the video I/F 209. Audio data, which is generated in the CPU 202 when the game program is executed, is outputted from the memory controller 203 to the speaker 201 via the audio I/F 211. Note that, in the present embodiment, memory dedicated to image processing is separately provided as hardware. However, an architecture called UMA (Unified Memory Architecture) using a portion of the main memory 205 as image processing memory, for example, may be used for image processing.

Figure 3:
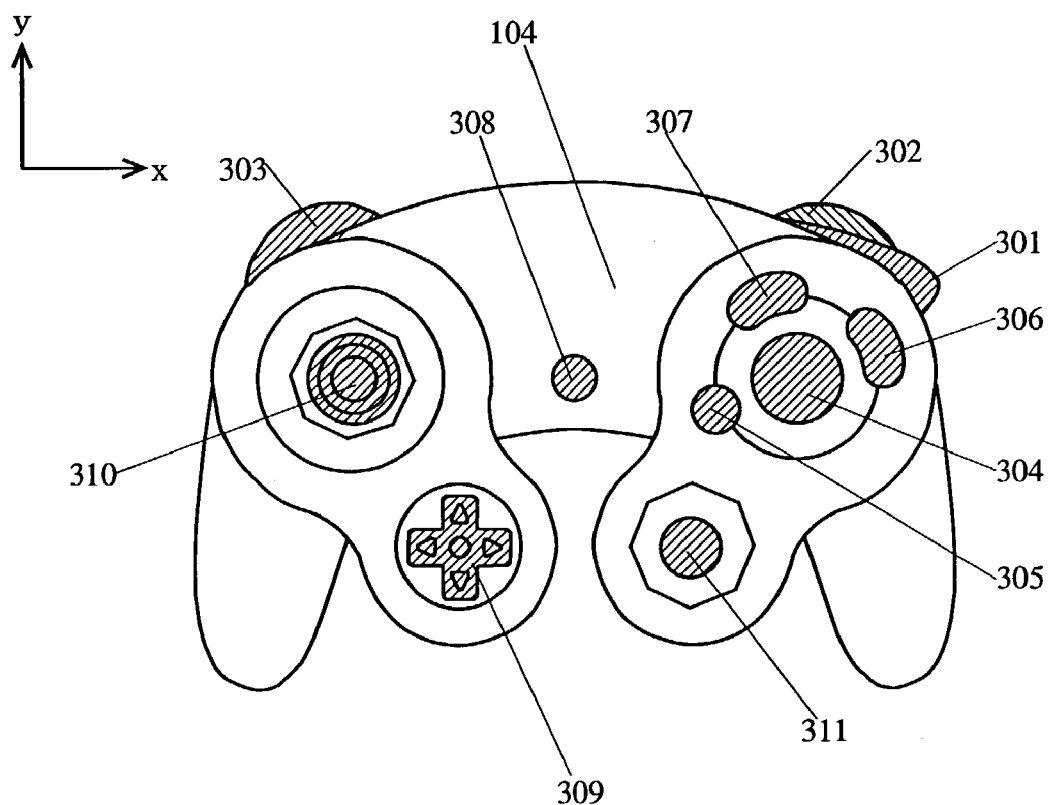
FIG. 3 is an illustration showing a layout of operation switches of a controller 104 shown in FIG. 1.

The operation data generated by the controller 104 is described next. FIG. 3 is an illustration showing a layout of operation switches 301 to 311 of a controller 104 shown in FIG. 1. In FIG. 3, the controller 104 includes a Z button 301, an R button 302, an L button 303, an A button 304, a B button 305, an X button 306, a Y button 307, a start button 308, a cross key 309, a main analog stick 310, and a sub-analog stick 311. Shown in FIG. 4 is the structure of the operation data generated in the controller 104 structured above.

As shown in FIG. 4, the operation data 4 contains, for example, 7 bytes. Eight bits of a first byte each represent the operation status of the Z button 301, the R button 302, the L button 303, the A button 304, the B button 305, the X button 306, the Y button 307, and the start button 308, respectively. Specifically, the eight bits of the first byte represent whether the buttons are each pressed or not. A second byte represents the operation status of the cross key 309. Four bits of the first half of the second byte represents whether respective upper, lower, left, and right buttons of the cross key 309 are pressed or not. Note that the other four bits of the second byte are not used in the present embodiment.

A third byte represents X-axis data of the main analog stick 310. The X-axis data is data representing the degree to which the main analog stick 310 is tilted in the direction of the X-axis shown in FIG. 3. That is, the third byte represents the degree to which the main analog stick 310 is tilted in the direction of the X-axis shown in FIG. 3. Therefore, values inputted into the main analog stick 310 vary in accordance with the degree of pressure exerted by the player. A fourth byte represents Y-axis data of the main analog stick 310. The Y-axis data is data representing the degree to which the main analog stick 310 is tilted in the direction of the Y-axis shown in FIG. 3. As such, the third and fourth bytes of the operation data 4 represent the angle (degree) and direction in which the main analog stick 310 is tilted. Fifth and sixth bytes represent data of X and Y-axes, respectively, of the sub-analog stick 311. Therefore, similar to the main analog stick 310, fifth and sixth bytes of the operation data 4 represent the angle (degree) and direction in which the sub-analog stick 311 is tilted.

A seventh byte represents analog data of the R button 302 and the L button 303. Here, the analog data of the R button 302 (L button 303) is data representing the pressure exerted on the R button 302 (L button 303). Therefore, values represented by the data of the seventh byte vary in accordance with the pressure (for example, the degree of pressure at which the button is pressed) exerted on the R button 302 or the L button 303 by the player. The first four bits of the seventh byte represent the analog data of the R button 302, and the other four bits represent that of the L button 303. Note that operation data and operation switches of the controller 105 are similar to those of the controller 104, which has been described above by using FIGS. 3 and 4.

Figure 5:
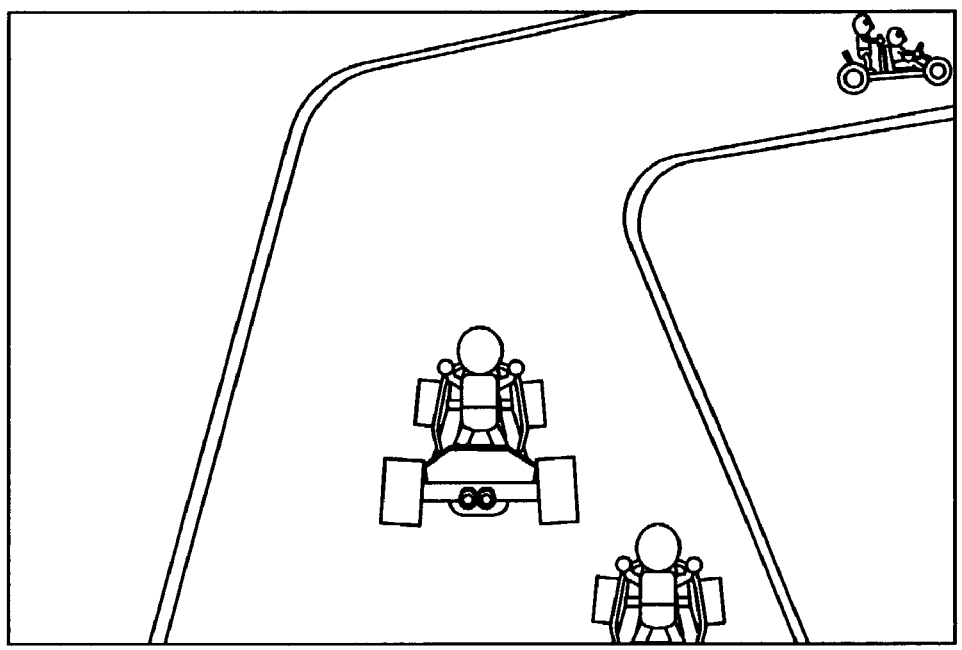
FIG. 5 is an illustration showing an example display of the game played in the present embodiment.
Figure 6A:
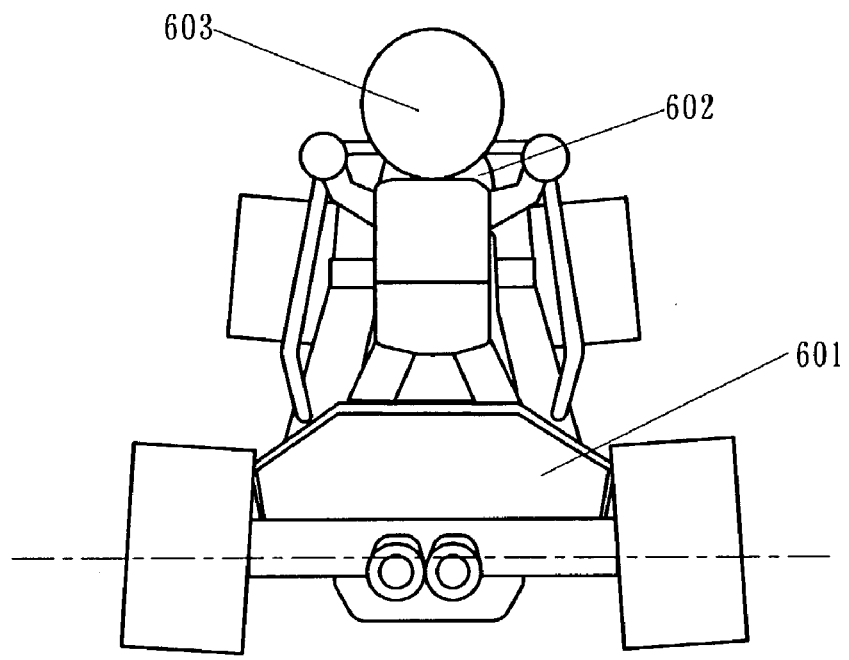
FIG. 6A is an illustration of characters, which are operated by players in the game shown in FIG. 5, as viewed from behind the kart.
Figure 6B:
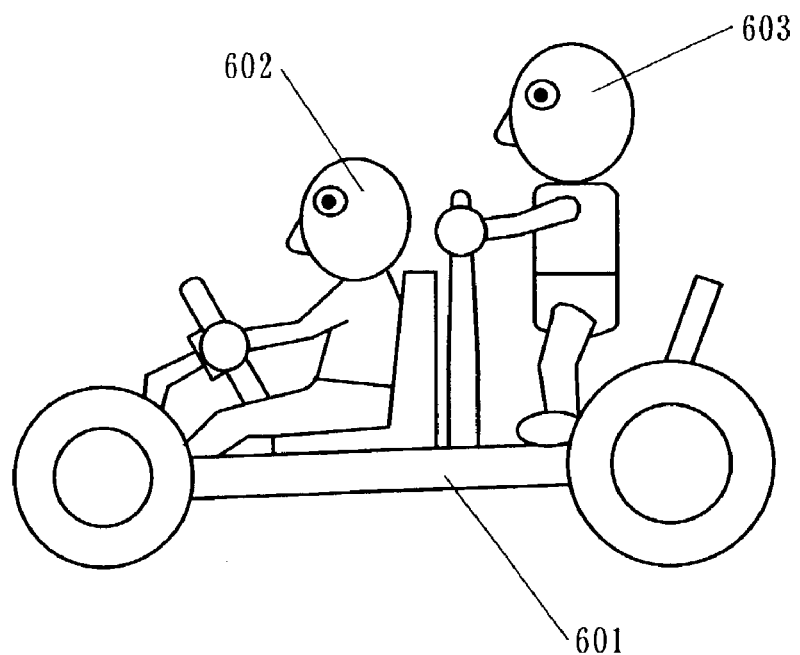
FIG. 6B is an illustration of characters, which are operated by players in the game shown in FIG. 5, as viewed from the side of the kart.

Described next is the brief outline of the game played in the present embodiment. FIG. 5 is an illustration showing an exemplary display of the game played in the present embodiment. FIGS. 6A and 6B are illustrations showing characters operated by the players in the game shown in FIG. 5. Note that FIG. 6A is an illustration of characters viewed from behind a kart, and FIG. 6B is an illustration of those viewed from the side of the kart. The game played in the present embodiment is a race game as shown in FIG. 5, and the players operate the characters shown in FIGS. 6A and 6B. According to the present embodiment, the game can be played by a single character. However, described hereafter is the case where the game is played by two players. Note that the two players are referred to as player A and player B, respectively. As shown in FIGS. 6A and 6B, the characters operated by players are a movable character (kart) 601, a driver character 602 driving the movable character 601, and a fellow passenger character 603 riding on the movable character 601. Note that the movable character 601, the driver character 602, and the fellow passenger character 603 move as one united body. Player A uses the controller 104 to operate a character set as the driver character 602. On the other hand, player B uses the controller 105 to operate a character set as the fellow passenger character 603. Here, operations performed on the driver character 602 and the fellow passenger character 603 are reflected on the motions of the respective characters, and are also reflected on the motion of the movable character 601. Therefore, operations of the movable character 601 depend on both operations of the driver character 602 and the fellow passenger character 603 performed by player A and player B, respectively. In the present race game, players A and B perform these operations described above to drive the kart, and have a race with other karts operated by other players or game machines. Note that, in the following description, the characters operated by players A and B, that is, the movable character 601 (kart), the driver character 602, and the fellow passenger character 603 are collectively referred to as an operation subject character.

Note that, in the present embodiment, it is possible to change the characters set as the driver character 602 and the fellow passenger character 603 as desired by each player. Specifically, in the game according to the present embodiment, there are previously provided a plurality of human-like characters that can be both the driver character 602 and the fellow passenger character 603. Before the game is started, characters are selected from the predetermined human-like characters, and are set as the driver character 602 and the fellow passenger character 603. That is, players can assign the roles of the driver character 602 and the fellow passenger character 603 to predetermined human-like characters before the game is started. It is possible to change the characters with each other set as the driver character 602 and the fellow passenger character 603 in response to the operations exerted on the buttons of the controllers at the players' desired timing during the race. Furthermore, each character has a unique attribute (for example, body weight, etc.) to allow the movable character 601 to move more changeably. For example, if a heavy character drives the movable character 601, the movable character 601 is more resistant to rotating. On the other hand, the same character makes the movable character 601 more rotatable if it rides as a fellow passenger.

Figure 7:
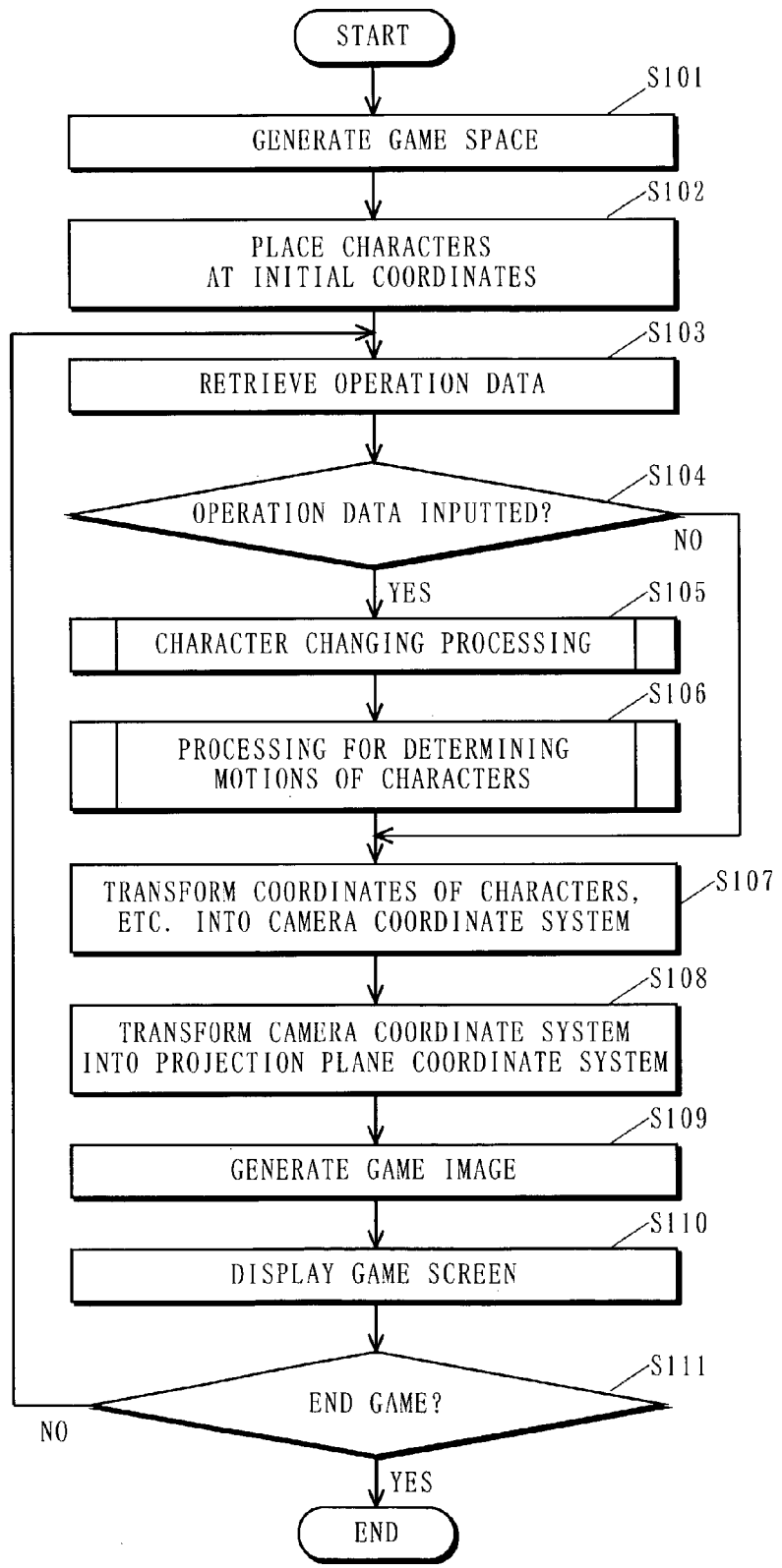
FIG. 7 is a flow chart showing game processing carried out in a CPU 202 of the present game machine.

Described next is game processing carried out by a game machine according to the present embodiment. Here, the game machine includes the game machine body 101 on which the DVD-ROM 102 is mounted, and the controllers 104 and 105. FIG. 7 is a flow chart showing the game processing carried out by the cooperated operations of the CPU 202 and the GPU 204 of the present game machine. In the present embodiment, the CPU 202 and the GPU 204 carry out the game processing by cooperating with each other. However, it is also possible, for example, to make the CPU 202 alone carry out almost all of the processing including geometry processing, etc.

After the game is started, the CPU 202 first generates a game space (step S101). Specifically, the CPU 202 places topographic objects for creating the topography such as a racecourse at initial coordinates of a three-dimensional coordinate system (world coordinate system) in the game space. Then, the CPU 202 places the operation subject character appearing in the game at initial coordinates of the world coordinate system (step S102). Note that a plurality of operation subject characters operated by the game machine may appear in the game. After the processing described above is carried out, the race is ready to start, and is started after step S102 is carried out.

After the race is started, the CPU 202 respectively receives the operation data 4 from the controllers 104 and 105 (step S103), and determines whether the operation data 4 includes data about input required for operating the game or not (step S104). Here, the operation data 4 received from the controller 104 is referred to as first operation data, and the operation data received from the controller 105 is referred to as second operation data. If the CPU 202 determines that "operation data is inputted" in step S104, this indicates that the operation data 4 includes data about input required for operating the game. Here, in the present embodiment, the game is operated, for example, with the Z button 301 of the controller 104 (controller used by player A), the A button 304, the main analog stick 310, and the Z, R, and L buttons of the controller 105 (controller used by player B). Therefore, if data about these inputs is included in the received first and second operation data, the CPU 202 determines that the operation data is inputted. On the other hand, if data about these inputs is not included in the first and second operation data, the CPU 202 determines that the operation data is not inputted. For example, when only data about an input of the sub-analog stick 311 is included in the first operation data received in step S103, the CPU 202 determines that the operation data is not inputted.

When determining in step S104 that the operation data is not inputted, the CPU 202 skips steps S105 and S106, and proceeds to step S107 to continue processing. On the other hand, when determining that the operation data is inputted, the CPU 202 carries out character change processing (step S105). The character change processing is carried out for changing roles of the characters set as the driver character 602 and the fellow passenger character 603 shown in FIG. 6A. Note that the details of the character change processing are described in FIG. 9. After carrying out step S105, the CPU 202 carries out character motion determining processing (step S106) for determining each motion of the driver character 602, the follow passenger character 603, and the movable character 601. Note that the character motion determining processing is described in detail in FIG. 13.

Next, the CPU 202 issues a coordinate conversion instruction for the GPU 204. In response to the instruction, the GPU 204 transforms the coordinates of the characters or the topographic objects, etc., into a camera coordinate system (also referred to as a viewpoint coordinate system) based on a virtual camera from the world coordinate system (step S107). Here, the virtual camera functions as a viewpoint used in displaying the game space on the screen. Next, the GPU 204 transforms the camera coordinate system obtained by conversion in step S107 into a two-dimensional projection plane coordinate system (also referred to as a screen coordinate system) (step S108). While transforming the camera coordinate system into the projection plane coordinate system, the GPU 204 carries out processing such as clipping, specification of texture, or light adjustment. At the same time, the GPU 204 stores depth information from the viewpoint in the Z-buffer. Then, the GPU 204 carries out raster processing. That is, the GPU writes (render) color information (color data) about each polygon projected on the projection plane coordinate system, which is based on texture, into the color buffer 216 for generating a game image 204 while referring to the Z-buffer 217 (step S109), and makes the television 106 display the game image thereon (step S110). As such, processing in steps S103 to S110 is carried out to generate and display one game image.

After step S110 is completed, the CPU 202 determines whether the game is to be ended or not (step S111). For example, when the race has been ended, or the players have carried out a predetermined game exit operation, the CPU 202 determines that the game is to be ended. In this case, the CPU 202 ends the processing shown in FIG. 7. On the other hand, when determining that the game is not to be ended, the CPU 202 repeats the processing from step S103 through step S111.

Described next is character change processing carried out in step S105. First, the brief outline of the character change processing is described. As stated above, the character change processing is carried out for changing roles of the characters set as the driver character 602 and the fellow passenger character 603 shown in FIG. 6A. Specifically, in the character change processing, the CPU 202 changes, in response to an operation inputted by the players for changing characters, roles of the driver character 602 and the fellow passenger character 603. The CPU 202 also changes positions of the driver character 602 and the fellow passenger character 603. In the present embodiment, it is assumed that such processing is started when the Z buttons of the controllers 104 and 105 are pressed. The CPU 202 displays, when the Z buttons of the controllers 104 and 105 are pressed, an animated cartoon that shows the driver character 602 and the fellow passenger character 603 are being changed (in other words, reproduce motion data of the driver character and the fellow passenger character).

FIG. 8 is an illustration showing an example of an animated cartoon during the character change processing shown in step S105 of FIG. 7. As shown in FIG. 8, the CPU 202 displayed a plurality of game images so as to move the character set as the driver character 602 (character B in FIG. 8) to the back seat of the kart, and the character set as the fellow passenger character 603 (character A in FIG. 8) to the front seat of the kart. These game images are displayed by repeating, a plurality of times, processing of a loop from step S103 to step S111 shown in FIG. 7. Taking FIG. 8 as an example for description, an animated cartoon that shows the driver character 602 and the fellow passenger character 603 are being changed is displayed by images shown in FIG. 8 being sequentially displayed in step S110. The character change processing in step S105 is carried out for displaying such an animated cartoon. Described below are details of the character change processing.

Figure 9:
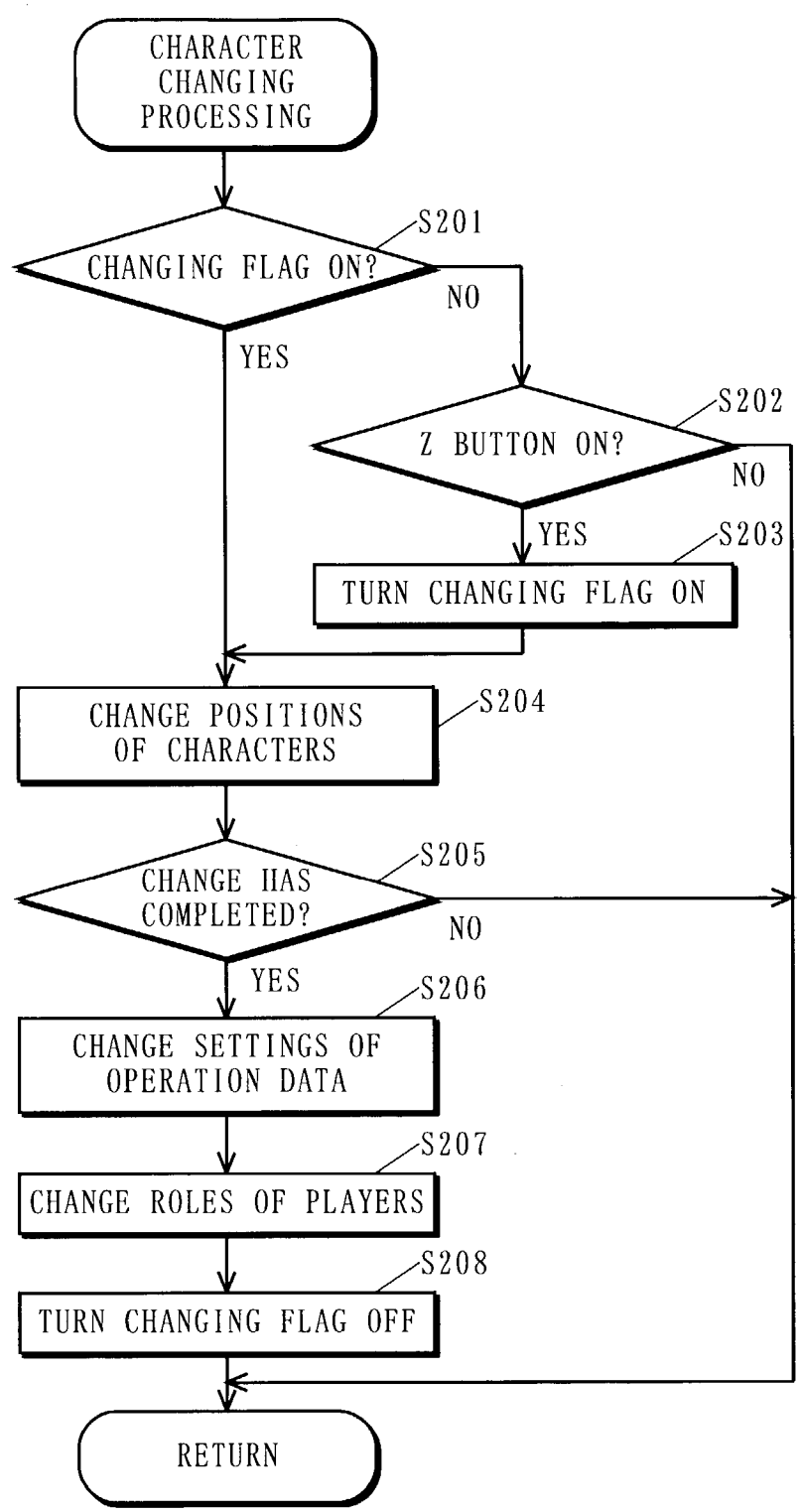
FIG. 9 is a flowchart showing details of step S105 shown in FIG. 7.

FIG. 9 is a flowchart showing details of step S105 shown in FIG. 7. The CPU 202 determines whether a changing flag is ON or not (step S201). Here, the changing flag is a flag showing whether the CPU 202 is carrying out character change processing or not. That is, when the changing flag is ON, the CPU 202 is carrying out character change processing. On the other hand, when the changing flag is OFF, the CPU 202 is not carrying out character change processing. In step S201, when the changing flag is ON, the CPU 202 carries out step S204, and skips step S202. Therefore, in the course of character change processing, the CPU 202 do not carry out processing using the operation data 4 received in step S103. That is, in the course of character change processing, operations inputted by the players are ignored.

On the other hand, when the changing flag is OFF in step S201, the CPU 202 determines, based on the operation data 4 received in step S103, whether the Z buttons of the controller 104 and 105 are pressed or not (step S202). Step S202 is a step of determining whether an operation instruction for character change processing (hereinafter, referred to as third operation instruction) is inputted or not. Determination in step S202 is carried out by referring to the first bit of the first byte in the first and second operation data received in step S103 (refer to FIG. 4). When determining in step S202 that the Z buttons are pressed, the CPU 202 sets the changing flag ON (step S203), and proceeds to step S204 to continue the processing. On the other hand, when the Z buttons are not pressed, the CPU 202 ends the character change processing carried out in step S105.

When the changing flag is ON in step S201, or the flag is set ON in step S203, the CPU 202 carries out position change processing (step S204). The position change processing is carried out for, as illustrated in FIG. 8, changing positions of the characters set as the driver character 602 and the characters set as the fellow passenger character 603. That is, in step S204, the CPU 202 gradually changes position coordinates or postures of the characters set as the driver character 602 and the fellow passenger character 603 so as to change positions between the two characters. Take FIG. 8 as an example for description. When the driver character 602 and the fellow passenger character 603 are in the state (b) shown in FIG. 8 in the position change processing carried out in the last loop (loop from step S103 to step S111), the CPU 202 determines that the state (b) changes into the state (c) shown in FIG. 8. As stated above, character change processing is carried out by repeating, a plurality of times, processing of a loop from step S103 to step S111 shown in FIG. 7. That is, to complete the character change, position change processing is required to be carried out a plurality of times.

Next, the CPU 202 determines whether a character change is completed or not (step S205) based on the result of the last position change processing carried out in step S204. Take FIG. 8 as an example for description. When the driver character 602 and the fellow passenger character 603 are in the state (e) shown in FIG. 8 in the last position change processing, the CPU 202 determines that a character change is completed. On the other hand, when each character is not in the state (e) shown in FIG. 8 in the last position change processing, the CPU determines that the character change is not completed.

When determining that the character change is not completed in step S205, the CPU ends the character change processing carried out in step S105. In this case, the changing flag remains to be set ON. Thus, the position change processing in step S204 is carried out again in the next loop (loop from step S103 to step S111). On the other hand, when determining in step S205 that the character change is completed, the CPU 202 changes character data between the driver character 602 and the fellow passenger character 603 (step S206). The character data, which is a unique attribute of each of the above-stated characters, is body weight data in the present embodiment. That is, instep S206, the CPU 202 changes body weight data between the driver character 602 and the fellow passenger character 603.

Next, the CPU 202 changes roles between the players (step S207). That is, when player A operates the driver character 602, and player B operates the fellow passenger character 603, setting are so changed that player A operates the fellow passenger character 603, and player B operates the driver character 602, respectively. Specifically, the settings on the first operation data received from the controller 104 are changed so as to operate the character set as the fellow passenger character 603, and the settings on the second operation data received from the controller 105 are changed so as to operated the character set as the driver character 602. As a result, the character originally operated by the first operation data (driver character) is operated based on the second operation data, and the character originally operated based on the second operation data (fellow passenger character) is operated by the first operation data. Finally, the CPU 202 sets the changing flag OFF (step S208), and ends the character change processing.

In the present embodiment, the Z buttons of the controllers 104 and 105 are pressed to carry out character change processing for changing roles of the characters set as the driver character 602 and the fellow passenger character 603. Here, in another embodiment, the Z button of either the controller 104 or the controller 105 may be pressed to carry out character change processing.

Described next is character motion determining processing carried out in step S106. First, the brief outline of the character motion determining processing is described. The character motion determining processing is carried out for determining each motion of the driver character 602, the fellow passenger character 603, and the movable character 601 based on the first and second operation data received from the controllers 104 and 105. Described next is the relationship between the motion of each character and operations of the controllers 104 and 105 by using FIGS. 10A and 10B, FIG. 11, and FIGS. 12A to 12D. In this case, as described above, it is assumed that player A uses the controller 104 to operate the character set as the driver character 602, and player B uses the controller 105 to operate the character set as the fellow passenger character 603.

The driver character 602 is operated by the main analog stick 310 of the controller 104. Specifically, player A tilts the main analog stick 310 of the controller 104 so as to make the driver character 602 turn the steering wheel. Note that the operation of the main analog stick 310 also relates to the motion of the movable character 601 (kart).

Figure 10A:
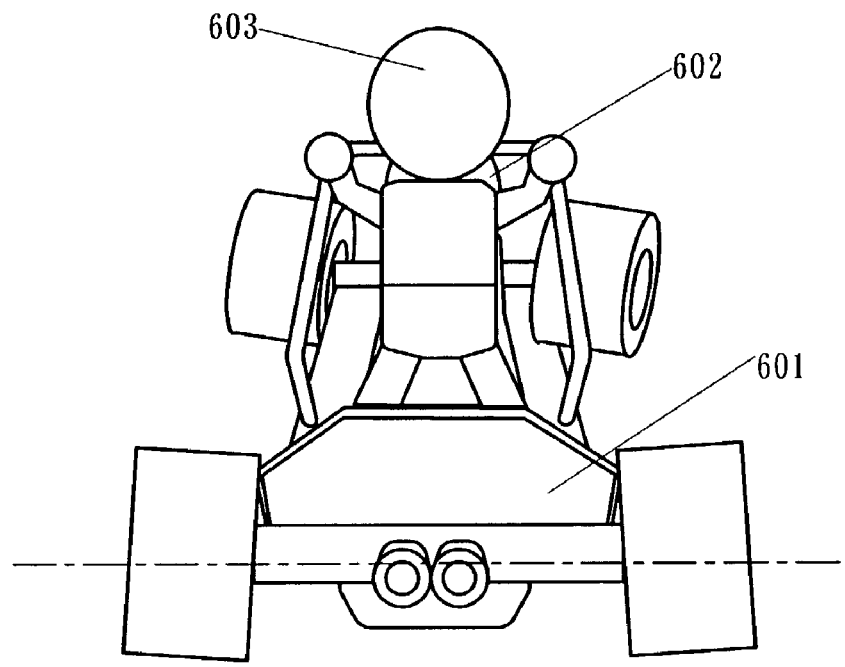
FIG. 10A is an illustration showing a display of each character shown in FIG. 6A as viewed from behind a kart, when a main analog stick 310 of the controller 104 is tilted to the right.
Figure 10B:
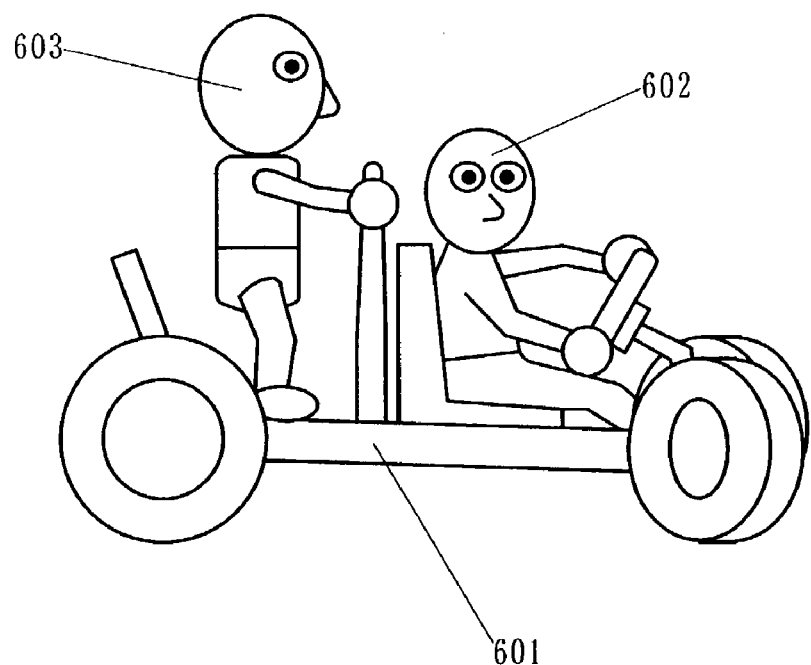
FIG. 10B is an illustration showing a display of each character shown in FIG. 6A as viewed from the side of a kart, when the main analog stick 310 of the controller 104 is tilted to the right.

FIGS. 10A and 10B are illustrations showing a display of each character shown in FIG. 6A when the main analog stick 310 of the controller 104 is tilted to the right. Note that FIG. 10A is an illustration of the characters viewed from behind the kart, and FIG. 10B is an illustration of the characters viewed from the side of the kart. When the main analog stick 310 of the controller 104 is tilted to the right as shown in FIG. 10B, the driver character 602 turns the steering wheel to the right while turning its head to the right. In this case, the movable character 601 turns the front wheels to the right, and changes the traveling direction to the right.

The fellow passenger character 603 is operated by the R and L buttons of the controller 105. Specifically, player B presses the R button of the controller 105 so as to make the fellow passenger character 603 apply its weight on the right side of the movable character 601. Furthermore, player B presses the L button so as to make the fellow passenger character 603 apply its weight on the left side of the kart. Note that the operations of the R and L buttons also relate to the motion of the movable character 601.

Figure 11:
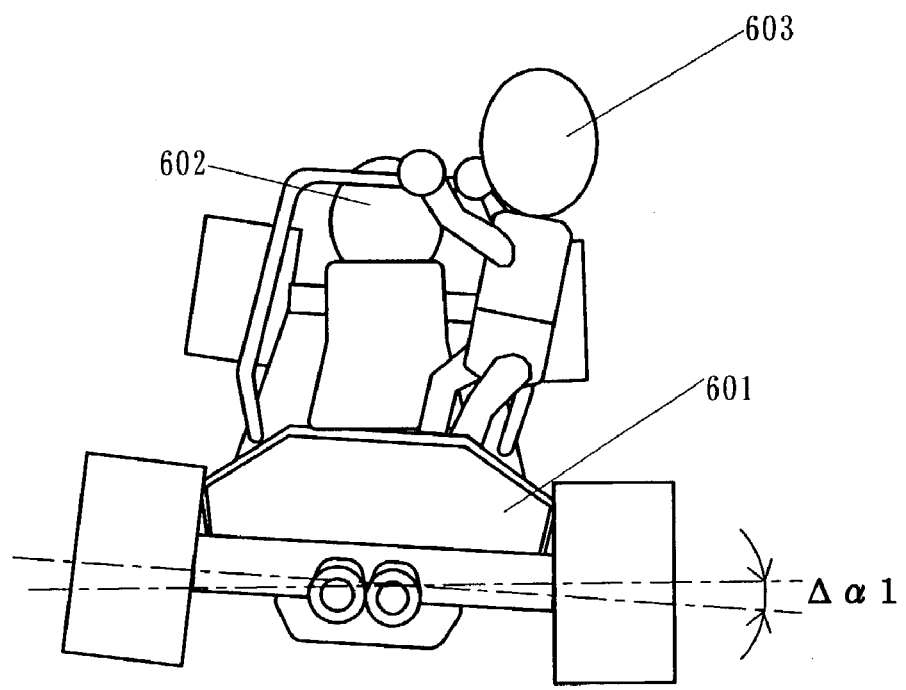
FIG. 11 is a display of each character shown in FIG. 6A when an R button of a controller 105 is pressed.

FIG. 11 is a display of each character shown in FIG. 6A when the R button of the controller 105 is pressed. As shown in FIG. 11, when the R button of the controller 105 is pressed, the fellow passenger character 603 moves so as to apply its weight on the right side of the movable character 601. In this case, the movable character 601 changes its tilt by a predetermined angle (in FIG. 11, $\Delta\alpha 1$) to the right, and changes the traveling direction to the right. In the present embodiment, the motion of the movable character 601 is determined based only on the determination whether either the R or L button is pressed or not. Here, in another embodiment, the fellow passenger character 603 may change the way its weight is applied on the kart (tilt) in accordance with the degree either R or L button is pressed.

Described next is the motion of the movable character 601. The movable character 601 travels in a direction determined by the main analog stick 310 of the controller 104 and the R and L buttons of the controller 105, and travels at a speed determined by the A button 304 of the controller 104. Therefore, there is a link between the motion relating to the traveling direction of the movable character 601 and the motions of the driver character 602 and the fellow passenger character 603. In other words, the motion of the movable character 601 varies according to the motions of the driver character 602 and the fellow passenger character 603. FIGS. 12A to D are illustrations showing the traveling direction of the movable character 601 shown in FIG. 6A when the main analog stick 310 of the controller 104 and the R button of the controller 105 are operated. Described below are details of the operation of the movable character 601.

Figure 12A:
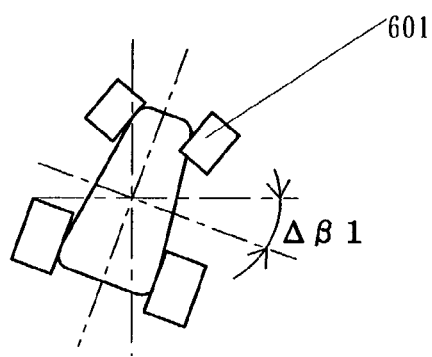
FIGS. 12A, 12B, 12C, and 12D are illustrations showing the traveling direction of a movable character shown in FIG. 6A when the main analog stick 310 of the controller 104 and an R button (L button) of the controller 105 are operated.
Figure 12B:
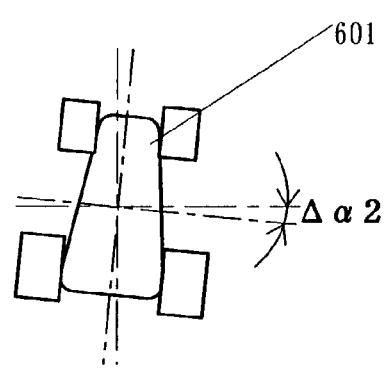

First, as shown in FIG. 12A, when only the main analog stick 310 of the controller 104 tilts by a predetermined angle to the right, the direction of the movable character 601 changes by an angle of $\Delta\beta 1$ to the right. FIG. 12A shows the same case as shown in FIG. 10A. Furthermore, as shown in FIG. 12B, when only the R button of the controller 105 is pressed, the direction of the movable character 601 changes by an angle of $\Delta\alpha 2$ to the right. Note that FIG. 12B shows the same case as shown in FIG. 11. Therefore, as shown in FIG. 11, the movable character 601 changes its tilt by an angle of Δα1 in the clockwise direction around a rotational axis of the movable character 601 along the traveling direction, which is not shown in FIG. 12B.

Figure 12C:
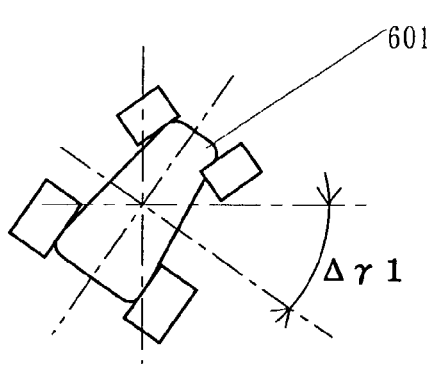

Next, as shown in FIG. 12C, when the main analog stick 310 of the controller 104 tilts by a predetermined angle (the same angle as provided in FIG. 12A) to the right, and the R button of the controller 105 is pressed, the direction of the movable character 601 changes by an angle of Δγ1 to the right. In this case, the driver character 602 is operated so as to turn the steering wheel to the right, and the fellow passenger character 603 is operated so as to apply its weight on the right side of the movable character 601. Here, the angle of Δγ1 is larger than the sum of the angles of Δβ1 and Δα2. Therefore, when both of the driver character 602 and the fellow passenger character 603 are operated so as to turn the movable character 601 to the right, the movable character 601 turns to the right in a bigger arc, in other words, turns more easily to the right compared with the case where either the driver character 602 or the fellow passenger character is operated.

Figure 12D:
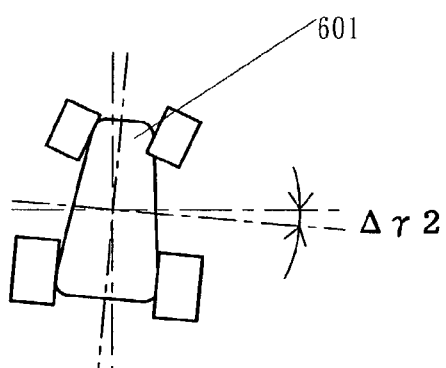

Still further, as shown in FIG. 12D, when the main analog stick 310 of the controller 104 tilts by a predetermined angle (the same angle as provided in FIG. 12A) to the right, and the L button of the controller 105 is pressed, the direction of the movable character 601 changes by an angle of Δγ2 to the right. In this case, the driver character 602 is operated so as to turn the steering wheel to the right, and the fellow passenger character 603 is operated so as to apply its weight on the left side of the movable character 601. Here, the angle of Δγ2 is smaller than the angle of Δβ1. Therefore, when the driver character 602 is operated so as to turn the movable character 601 to the right, and the fellow passenger character 603 is operated so as to turn the movable character 601 to the left, the movable character 601 turns to the right by a smaller angle, in other words, turns to the right with more difficulty compared with the case where only the driver character 602 is operated. As such, the motion of the movable character 601 is determined based not only on the operation of the driver character 602 but also on the operation of the fellow passenger character 603.

Figure 13:
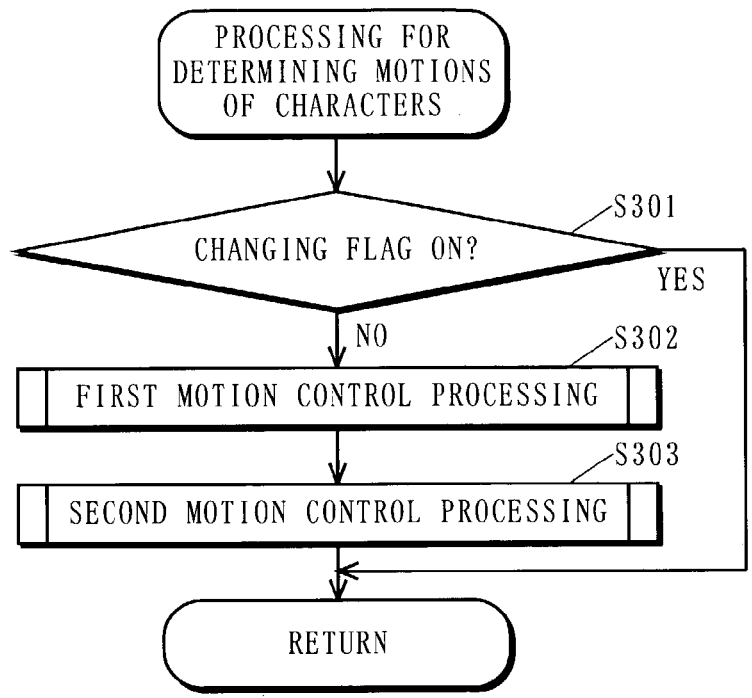
FIG. 13 is a flowchart showing details of step S106 shown in FIG. 7.

Described below are details of the character motion determining processing carried out in step S106. FIG. 13 is a flowchart showing details of step S106 shown in FIG. 7. First, the CPU 202 determines whether the changing flag is ON or not (step S301). When the changing flag is ON, the CPU 202 ends the character motion determining processing. Therefore, the CPU 202 does not carry out any processing using the operation data 4 received in step S103 in the course of character change processing. That is, operations inputted by the players in the course of a character change processing are ignored. On the other hand, when the changing flag is OFF, the CPU 202 carries out first motion control processing (step S302). The first motion control processing is carried out for controlling the motion of the driver character 602. In the first motion control processing, the motion of the driver character 602 is determined based on the operation performed on the main analog stick 310 of the controller 104. Described below are details of the first motion control processing.

Figure 14:
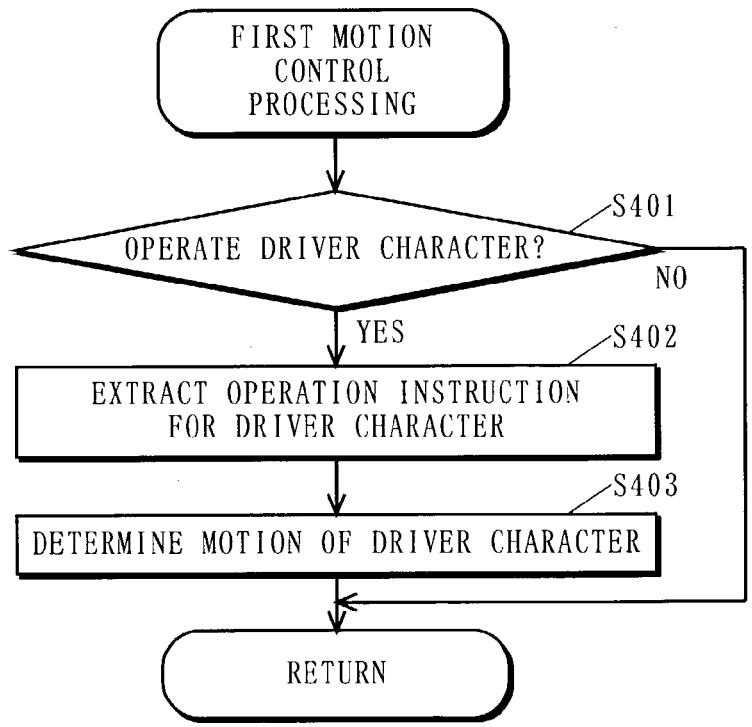
FIG. 14 is a flowchart showing details of step S302 shown in FIG. 13.

FIG. 14 is a flowchart showing details of step S302 shown in FIG. 13. First, the CPU 202 determines whether the driver character 602 is operated or not (step S401) based on whether the first operation data received in step S103 includes data for operating the driver character 602 or not. That is, when an area of the first operation data about the main analog stick 310 (third and fourth bytes) includes information indicating that the main analog stick 310 is tilted, the CPU 202 determines that the driver character 602 is operated. On the other hand, when data included in the area of the first operation data about the main analog stick 310 indicates that the main analog stick 310 is not tilted, the CPU 202 determines that the driver character 602 is not operated. When determining in step S401 that the driver character 602 is not operated, the CPU 202 ends the first motion control processing carried out in step S302. On the other hand, when determining in step S401 that the driver character 602 is operated, the CPU 202 extracts an operation instruction for the driver character 602 (referred to as a first operation instruction) from the first operation data received in step S103 (step S402). That is, the CPU 202 extracts the third and fourth data from the first operation data. Furthermore, the CPU 202 determines the motion of the driver character 602 based on the extracted first operation instruction (step S403), and ends the first motion control processing carried out in step S302. In step S403, a motion is determined where the driver character 602 turns the steering wheel while turning its head according to an angle of the main analog stick 310 tilted in the direction of the X-axis.

Description hereinafter returns to the description of FIG. 13. After completing the first motion control processing, the CPU 202 carries out second motion control processing (step S303) for controlling the motion of the fellow passenger character 603 and the movable character 601. In the second motion control processing, the motion of the fellow passenger character 603 is determined based on the operations performed on the R and L buttons of the controller 105. Furthermore, in the second motion control processing, the motion of the movable character 601 is determined based on the motion of the fellow passenger character 603. That is, the motion of the movable character 601 is determined based on the operations performed not only on the main analog stick 310 and the A button 304 of the controller 104, but also on the R and L buttons of the controller 105. Described below are details of the second motion control processing.

Figure 15:
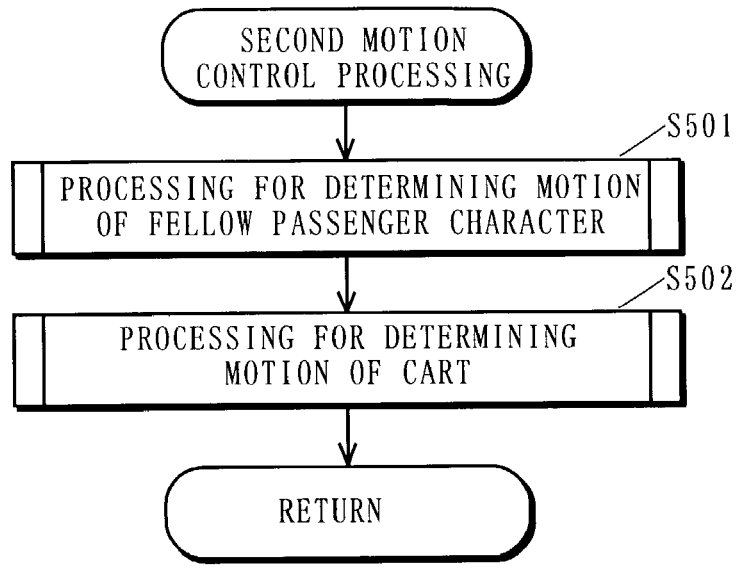
FIG. 15 is a flowchart showing details of step S303 shown in FIG. 13.

FIG. 15 is a flowchart showing details of step S303 shown in FIG. 13. First, the CPU 202 carries out motion determining processing for the fellow passenger character 603 (step S501) for determining the motion of the fellow passenger character 603 based on the operations performed on the R and L buttons of the controller 105. Described below are details of the motion determining processing for the fellow passenger character 603 shown in step S501.

Figure 16:
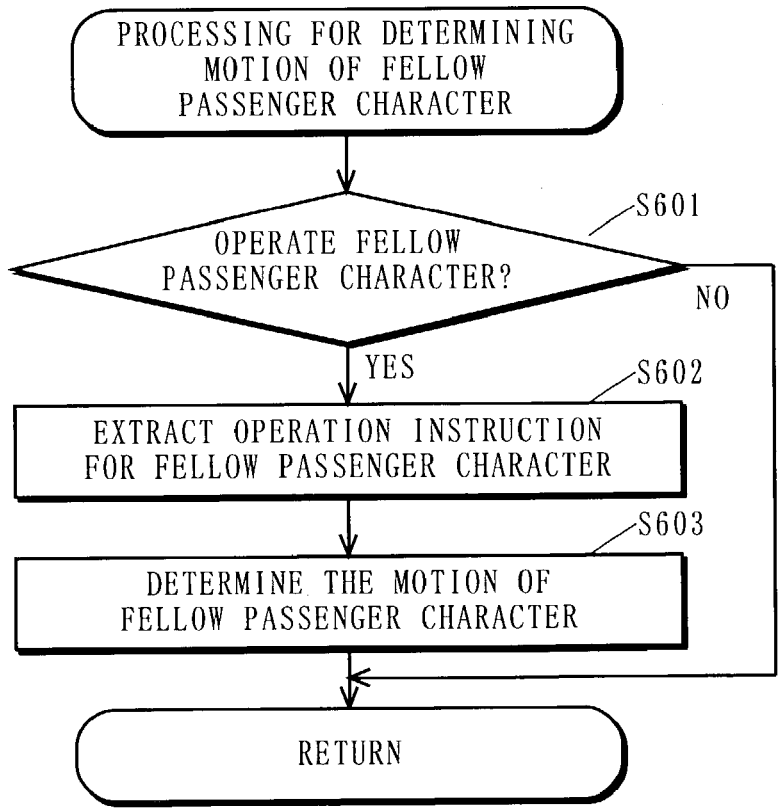
FIG. 16 is a flowchart showing details of step S501 shown in FIG. 15.

FIG. 16 is a flowchart showing details of step S501 shown in FIG. 15. First, the CPU 202 determines whether the fellow passenger character 603 is operated or not (step S601) based on whether the second operation data received in step S103 includes data for operating the fellow passenger character 603 or not. That is, when an area relating to the R and L buttons of the second operation data includes information indicating that either of the R or L buttons is pressed, the CPU 202 determines that the fellow passenger character 603 is operated. On the other hand, when data included in the above-described area of the second operation data indicates that any of the R and L buttons is not pressed, the CPU 202 determines that the fellow passenger character 603 is not operated. Note that, in the present embodiment, it is assumed that second and third bits of the first byte are used as an area relating to the R and L buttons of the second operation data, and that analog data of the seventh byte is not used.

When determining in step S601 that the fellow passenger character 603 is not operated, the CPU 202 ends the second motion control processing carried out in step S501. On the other hand, when determining in step S601 that the fellow passenger character 603 is operated, the CPU 202 extracts an operation instruction for the fellow passenger character 603 (hereinafter, referred to a second operation instruction) from the second operation data received in step S103 (step S602). That is, the CPU 202 extracts data included in second and third bits of the first byte from the second operation data. Furthermore, the CPU 202 determines the motion of the fellow passenger character 603 based on the extracted second operation data (step S603), and ends the motion control processing for the fellow passenger character 603 carried out in step S501. In step S603, a motion is determined where the fellow passenger character 603 applies its weight on the right side of the movable character 601 when the R button is pressed, and applies its weight on the left side of the movable character 601 when the L button is pressed.

Description hereinafter returns to the description of FIG. 15. After completing the motion determining processing for the fellow passenger character 603, the CPU 202 carries out motion determining processing for the movable character 601 (step S502) for determining the motion of the movable character 601 based on operations performed not only on the main analog stick 310 and the A button of the controller 104 but also on the R and L buttons of the controller 105. Described below are details of the motion determining processing for the movable character 601.

Figure 17:
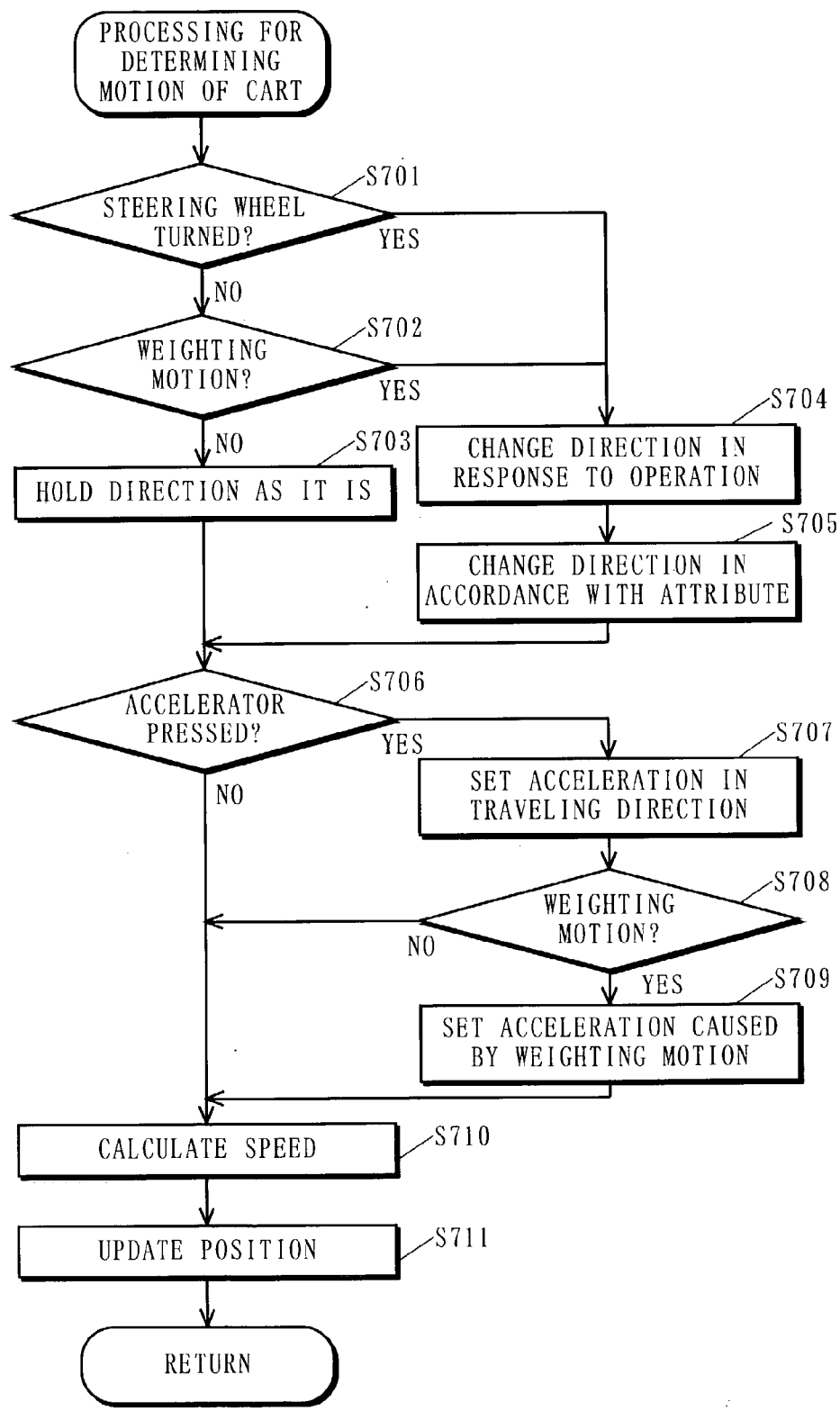
FIG. 17 is a flowchart showing details of step S502 shown in FIG. 15.

FIG. 17 is a flowchart showing details of step S502 shown in FIG. 15. First, the CPU 202 determines whether the driver character 602 is operated or not, that is, whether the driver character 602 is operated so as to turn the steering wheel or not (step S701). The determination made in step S701 is similar to that made in step S401 shown in FIG. 14. When determining the driver character 602 is operated so as to turn the steering wheel in step S701, the CPU 202 then determines whether the fellow passenger character 603 is operated or not, that is, whether the fellow passenger character 603 is operated so as to apply its weight on the kart or not (step S702). The determination made in step S702 is similar to that made in step S601 shown in FIG. 16. When determining the fellow passenger character 603 is not operated so as to apply its weight on the kart in step S702, that is, when both of the driver character 602 and the fellow passenger character 603 are not operated, the CPU 202 holds the direction of the movable character 601 as it is (step S703).

When determining either the driver character 602 is operated so as to turn the steering wheel in step S701 or the fellow passenger character 603 is operated so as to apply its weight on the kart in step S702, the CPU 202 changes the direction of the movable character 601 according to an operation (step S704). Specifically, the CPU 202 extracts data about the main analog stick 310 of the controller 104 from the first operation data received in step S103, and extracts data about the R and L buttons of the controller 105 from the second operation data received in step S103. Then, the CPU 202 determines the direction of the movable character 601 based on the extracted data. Furthermore, when determining that the fellow passenger character 603 is operated so as to apply its weight on the kart in step S702, the CPU 202 also changes the tilt of the movable character 601. In the above-stated description of FIGS. 12A to 12D, the method for determining the direction of the movable character 601 is described.

After completing step S704, the CPU 202 changes the direction of the movable character 601 based on the attribute of each of the driver character 602 and the fellow passenger character 603 (step S705). As stated above, in the present embodiment, a plurality of human-like characters that can be any of the driver character 602 and the fellow passenger character 603 are previously provided, and each human-like character has a unique attribute (in the present embodiment, body weight is exemplarily used). In the processing carried out in step S705, the CPU 202 further changes the direction of the movable character 601 based on the unique attribute of each human-like character. For example, the CPU 202 changes the degree to which it adjusts the traveling direction of the movable character 601 by the weighting motion of the fellow passenger character 603 based on the difference in body weight between the driver character 602 riding on the front of the movable character 601 and the fellow passenger character 603 riding on the back thereof. Specifically, the CPU 202 changes the angle of $\Delta\gamma1$ shown in FIG. 12C or the angle of $\Delta\gamma2$ shown in FIG. 12D based on the difference in body weight. For example, when the driver character 602 is heavier in body weight than the fellow passenger character 603, the CPU 202 reduces the degree to which it adjusts the traveling direction of the movable character 601 by the weighting motion of the fellow passenger character 603. That is, the CPU 202 reduces the difference between the angles of $\Delta\gamma1$ and $\Delta\beta1$ and the difference between the angles of $\Delta\gamma2$ and $\Delta\beta1$. On the other hand, when the driver character 602 is lighter in body weight than the fellow passenger character 603, the CPU 202 widens the difference between the angles of $\Delta\alpha1$ and $\Delta\beta1$ and the difference between the angles of $\Delta\alpha2$ and $\Delta\beta1$. The direction of the movable character 601 is determined by the above-described processing carried out in steps S701 to S705. Furthermore, when determining that the fellow passenger character 603 is operated so as to apply its weight on the kart in step S702, the CPU 202 also changes the tilt of the movable character 601.

After determining the direction of the movable character 601, that is, after completing step S703 or step S705, the CPU 202 determines whether the accelerator operation is performed on the movable character 601 or not (step S706) based on whether the first operation data received in step S103 includes data for operating the accelerator of the movable character 601 or not. That is, when an area relating to the A button 304 of the first operation data (fourth bit of the first byte) includes information indicating that the A button 304 is pressed, the CPU 202 determines that the accelerator operation is performed. On the other hand, when data included in the area relating to the A button of the first operation data indicates that the A button 304 is not pressed, the CPU 202 determines that the accelerator operation is not performed.

When determining the accelerator operation is not performed on the movable character 601 in step S706, the CPU 202 proceeds to step S710. On the other hand, when determining the accelerator operation is performed on the movable character 601 in step S706, the CPU 202 determines acceleration in the traveling direction (step S707). The acceleration in the traveling direction is represented with a vector whose direction is determined based on the traveling direction of the movable character 601 determined in steps S701 to S705. The acceleration in the traveling direction is described in FIG. 18. Furthermore, the CPU 202 determines whether the fellow passenger character 603 is operated so as to apply its weight on the kart or not (step S708). Note that the determination made in step S708 is similar to that made in step S702. When determining the fellow passenger character 603 is not operated so as to apply its weight on the kart in step S708, the CPU 202 proceeds to step S710. On the other hand, when determining the fellow passenger character 603 is operated so as to apply its weight on the kart in step S708, the CPU sets acceleration caused by weighting (step S709). In the present embodiment, the acceleration caused by weighting is represented with a vector having a predetermined angle to the traveling direction of the movable character 601. Note that the acceleration caused by weighting is described in FIG. 18.

Figure 18:
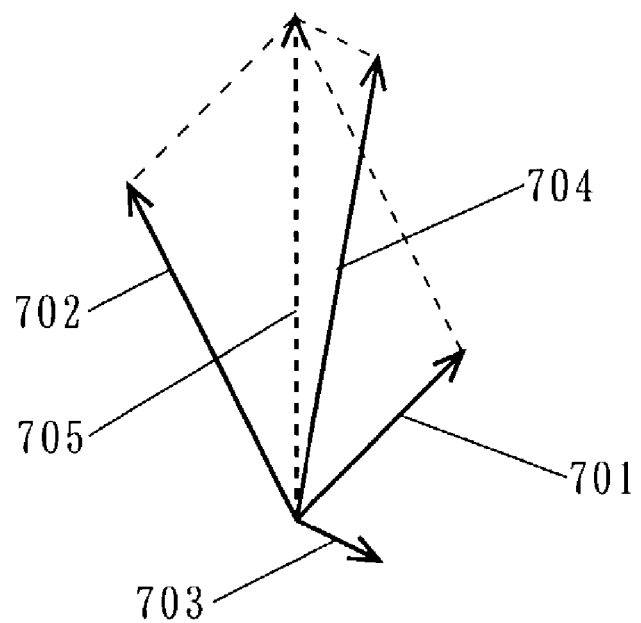
FIG. 18 is an illustration for describing a calculation method of the speed of a movable character in step S713 shown in FIG. 17.

After completing steps S706, S708, or S709, the CPU 202 calculates the speed of the movable character 601 (step S713). FIG. 18 is an illustration for describing a method for calculating the speed of the movable character in step S713 shown in FIG. 17. As shown in FIG. 18, a vector 704 representing the speed of the movable character 601 is calculated as a vector sum of a vector 701 representing the current speed, a vector 702 representing the acceleration in the traveling direction, and a vector 703 representing the acceleration caused by weighting. Here, the vector 701 representing the current speed is determined based on the speed of the movable character 601 calculated in step S713 of the previous loop (loop from steps S103 to S110). Furthermore, as stated above, the vector 702 representing the acceleration in the traveling direction is calculated in step S707, and the direction of the vector 702 is determined based on the operations performed on the main analog stick 310 of the controller 104 and the R and L buttons of the controller 105. Still further, the magnitude of the vector 702 is determined based on the pressure exerted on the A button 304 (for example, a period of time for which the A button 304 is pressed). The vector 703 representing the acceleration caused by weighting, which is calculated in step S709, points in the direction forming a predetermined angle to the traveling direction of the movable character 601. Furthermore, the magnitude of the vector 703 is determined at a predetermined magnitude. Note that, in another embodiment, in the case where the degree of pressure at which the R or L button is pressed changes the way in which the fellow passenger character 603 applies its weight on the kart (tilt), the magnitude of the vector 702 varies in accordance with the degree of pressure at which the R or L button is pressed. Note that, when acceleration in the traveling direction or acceleration caused by weighting is not calculated, the speed of the movable character 601 is calculated assuming that acceleration is 0. For example, when the acceleration caused by weighting is not provided in FIG. 18, that is, when the fellow passenger character 603 is not operated so as to apply its weight on the kart, the speed of the movable character 601 is represented as a vector sum 705 of the vector 701 representing the current speed and the vector 702 representing the acceleration in the traveling direction.

Next, the CPU 202 updates the position of the movable character 601 based on the speed calculated in step S710 (step S711), and ends the motion determining processing for the movable character 601 carried out in step S502. As such, determined are the direction (tilt) and position of the movable character 601 to be displayed. Note that the positions of the driver character 602 and the fellow passenger character 603 are so determined that both of them ride on the movable character 601.

As described above, according to the present embodiment, the players A and B can cooperate in operating the movable character 601. Furthermore, the players A and B each can operate any of the two characters, that is, the driver character 602 and the fellow passenger character 603. As such, according to the present embodiment, the players can experience a novel sensation in playing the game by each operating a different character while both cooperating to operate one character with each other.

Described above is the case where two players each operate one of the two controllers to play the game. However, one player may operate one controller to play the game. When one player plays the game, the player operates the game with one controller, therefore, operation data 4 is inputted from one controller. That is, when two players play the game, each of the operations switches of the controllers 104 and 105 is used for operating the game. On the other hand, when one player plays the game, each of the operation switches of either of the controllers (thereinafter, it is assumed to be the controller 104) is used for operating the game. More specifically, in the above embodiment, the Z button 301, the A button 304, and the main analog stick 310 of the controller 104, and the Z button, the R button, and the L button of the controller 105 are used. On the other hand, when one player plays the game, the Z button 301, the A button 304, the main analog stick 310, the R button 302, and the L button 303 of the controller 104 are used.

As such, when one player plays the game, the operation data 4 is received only from the controller 104 in step S103 shown in FIG. 7. Furthermore, in step S104, the determination is made based on whether data about the Z button 301, the A button 304, the main analog stick 310, the R button 302, and the L button 303 of the controller 104 is included or not. Note that, when one player plays the game, processing carried out in step S207 shown in FIG. 9 is not required because there is no need to change a role of the player. Still further, a third operation instruction for carrying out changing processing is inputted only by pressing the Z button 301 of the controller 104. That is, when one player plays the game, the determination made in step S202 shown in FIG. 9 is based on whether the Z button of the controller 104 is pressed or not.

When one player plays the game as described above, the player can operate the two characters, that is, the driver character 602 and the fellow passenger character 603 at the same time. Therefore, even when playing the game alone, the player can experience a novel sensation in playing the game. In this case, if just trying to operate the characters at the same time, the player is required to pay attention to the two characters, which makes the game very difficult to operate. However, according to the present embodiment, the motion of the movable character 601 is determined based on the motions of the above-described two characters, that is, the driver character 602 and the fellow passenger character 603. Accordingly, the player is required to be careful only in operating the movable character 601, which allows the player to play the game without noticing the difficulty in operating the two characters at the same time.

In the present embodiment, the players operate the three characters, that is, the movable character 601, the driver character 602, and the fellow passenger character 603. However, the number of the characters operated by the players may not be restricted to three. There may be at least two characters. For example, a character operated by player A may be the movable character, and a character operated by player B may be the fellow passenger character.

Furthermore, in the present embodiment, each character is assumed to be one human-like character or one kart. However, in another embodiment, one character may include a plurality of characters or movable vehicles (karts). For example, three human-like characters in total, that is, the fellow passenger character including two human-like characters and one driver character may ride on the kart operated by the players.

In the present embodiment, character change processing is carried out in step S105 shown in FIG. 7. In the character change processing, the players change roles of the characters set as the driver character 602 and the fellow passenger character 603, thereby changing the motion of the movable character 601 even by the same operation that has been performed before the character change processing. For example, when character A is the driver character 602 and character B is the fellow passenger character 603, the degree to which the direction of the movable character 601 is adjusted differs from that of the case where character A is the fellow passenger character 603 and character B is the driver character 602. As a result, the game is assumed to be more interesting. Note that, in the present embodiment, an attribute of each character is body weight. However, the attribute may be a somatotypic attribute such as body height, or an attribute that is totally irrelevant to a somatotype or the like.

While the invention has been described in detail, the foregoing description is in all aspects illustrative and not restrictive. It is understood that numerous other modifications and variations can be devised without departing from the scope of the invention.

What is claimed is:

1. A game apparatus for operating a plurality of characters appearing in a game space, comprising:
    a plurality of player-operable operation switches; and
    an image processing mechanism executing a game program in response to operations performed on the operation switches to generate a game image including images based on image data of the plurality of characters, wherein
    the image processing mechanism comprises:
        a first motion control mechanism for controlling a traveling motion of a first character appearing in the game space in response to an operation performed on a first operation switch included in the operation switches; and
        a second motion control mechanism for controlling, in response to an operation performed on a second operation switch included in the operation switches, a motion of a second character also appearing in the game space but different from the first character, and changing the traveling motion of the first character based on the motion of the second character.

2. A game machine for operating a plurality of characters appearing in a game space, comprising:
    a plurality of player-operable operation switches; and
    an image processing mechanism executing a game program in response to operations performed on the operation switches to generate a game image including images based on image data of the plurality of characters, wherein
    the image processing mechanism comprises:
        a first motion control mechanism for controlling a motion of a first character appearing in the game space in response to an operation performed on a first operation switch included in the operation switches; and
        a second motion control mechanism for controlling, in response to an operation performed on a second operation switch included in the operation switches, a motion of a second character also appearing in the game space but different from the first character, and changing the motion of the first character based on the motion of the second character; and
    the first and second operation switches are provided in a single controller operated by one player.

3. The game apparatus according to claim 1, wherein
    the first operation switch is provided in a first controller, the second operation switch is provided in a second controller, and the first and second operation switches are operated by different players.

4. The game apparatus according to claim 1, wherein
    the second motion control mechanism further changes the traveling motion of the first character when the motion of the second character is designated by the second operation switch while the first character is operated by the first operation switch.

5. The game apparatus according to claim 1, wherein the image processing mechanism collectively displays a movable character traveling in the game space and a driver character driving the movable character as the first character, and displays a fellow passenger character riding on the movable character as the second character,
    the first motion control mechanism controls traveling motions of the driver character and the movable character, and
    the second motion control mechanism controls the motion of the fellow passenger character, and changes the traveling motion of the movable character based on the motion of the fellow passenger character.

6. The game apparatus according to claim 5, wherein
    the second motion control mechanism makes the fellow passenger character apply weight on the movable character, and changes a traveling direction of the movable character based on the direction in which the fellow passenger character applies weight.

7. The game apparatus according to claim 6, wherein
    the first motion control mechanism changes the traveling direction of the movable character, and causes the driver character to make a motion of operating the movable character.

8. A game machine for operating a plurality of characters appealing in a game space, comprising:
    a plurality of player-operable operation switches; and
    an image processing mechanism executing a game program in response to operations performed on the operation switches to generate a game image including images based on image data of the plurality of characters, wherein
    the image processing mechanism comprises:
        a first motion control mechanism for controlling a motion of a first character appearing in the game space in response to an operation performed on a first operation switch included in the operation switches; and
        a second motion control mechanism for controlling, in response to an operation performed on a second operation switch included in the operation switches, a motion of a second character also appearing in the game space but different from the first character, and changing the motion of the first character based on the motion of the second character;
    the image processing mechanism collectively displays a movable character in the game space and a driver character driving the movable character as the first character, and displays a fellow passenger character riding on the movable character as the second character;
    the first motion control mechanism controls motions of the driver character and the movable character;
    the second motion control mechanism controls the motion of the fellow passenger character, and changes the motion of the movable character based on the motion of the fellow passenger character; and the image processing mechanism further comprises character change mechanism for changing roles of characters set as the driver character and the fellow passenger character in response to an operation performed on a third operation switch included in the operation switches.

9. The game apparatus according to claim 8, wherein the second motion control mechanism changes a degree to which the motion of the movable character is changed based on the motion of the fellow passenger character in accordance with unique characteristics predetermined for the driver character and the fellow passenger character.

10. The game apparatus according to claim 5, wherein the first operation switch is provided in a first controller, and the second operation switch is provided in a second controller, and the first and second operation switches are operated by different players.

11. The game machine for operating a plurality of characters appearing in a game space, comprising:

a plurality of player-operable operation switches; and an image processing mechanism executing a game program in response to operations performed on the operation switches to generate a game image including images based on image data of the plurality of characters, wherein the image processing mechanism comprises:

a first motion control mechanism for controlling a motion of a first character appearing in the game space in response to an operation performed on a first operation switch included in the operation switches; and a second motion control mechanism for controlling, in response to an operation performed on a second operation switch included in the operation switches, a motion of a second character also appearing in the game space but different from the first character, and changing the motion of the first character based on the motion of the second character;

the image processing mechanism collectively displays a movable character traveling in the game space and a driver character driving the movable character as the first character, and displays a fellow passenger character riding on the movable character as the second character;

the first motion control mechanism controls motions of the driver character and the movable character;

the second motion control mechanism controls the motion of the fellow passenger character, and changes the motion of the movable character based on the motion of the fellow passenger character;

the first operation switch is provided in a first controller, and the second operation switch is provided in a second controller, and the first and second operation switches are operated by different players; and the image processing mechanism further comprises a character change mechanism for changing roles of the characters set as the driver character and the fellow passenger character in response to an operation performed on a third operation switch provided in the first and/or second controller.

12. The apparatus according to claim 11, wherein when the character set as the driver character and the character set as the fellow passenger character change roles with each other by the character change mechanism, the first motion control mechanism changes settings so as to control the motion of the first character in response to an operation performed on the second operation switch instead of an operation performed on the first operation switch, and the second motion control mechanism controls the motion of the second character in response to an operation performed on the first operation switch instead of an operation performed on the second operation switch, and changes the motion of the first character.

13. A computer-readable recording medium storing a game program that causes a computer included in a game apparatus operating a plurality of characters that appear in a game space to execute, in response to an operation of a controller performed by a player, a set of steps comprising:

an operation instruction receiving step of receiving operation data representing a game operation instruction inputted by the player from a controller; and an image processing step of generating a game image including image data of the characters in response to the operation data, wherein the image processing step comprises:

a first motion control step of controlling a traveling motion of a first character appearing in the game space in response to a first operation instruction inputted by the player; and a second motion control step of controlling, in response to a second operation instruction that differs from the first operation instruction, a motion of a second character also appearing in the game space but different from the first character, and changing the traveling motion of the first character based on the motion of the second character.

14. A computer-readable recording medium storing a game program that causes a computer included in a game apparatus operating a plurality of characters that appear in a game space to execute, in response to an operation of a controller performed by a player, a set of steps comprising:

an operation instruction receiving step of receiving operation data representing a game operation instruction inputted by the player from a controller; and an image processing step of generating a game image including image data of the characters in response to the operation data, wherein the image processing step comprises:

a first motion control step of controlling a motion of a first character appearing in the game space in response to a first operation instruction inputted by the player; and a second motion control step of controlling, in response to a second operation instruction that differs from the first operation instruction, a motion of a second character also appearing in the game space but different from the first character, and changing the motion of the first character based on the motion of the second character; and in the operation instruction receiving step, operation data including the first and second operation instructions is received from a single controller operated by one player.

15. The recording medium according to claim 13, wherein in the operation instruction receiving step, first operation data including the first operation instruction is received from a first controller, second operation data including the second operation instruction is received from a second controller, and the first and second controllers are operated by different players.

16. The recording medium according to claim 13, wherein in the second motion control step, the traveling motion of the first character is further changed when the motion of the second character is designated by the second operation instruction while the first character is operated based on the first operation instruction.

17. The recording medium according to claim 13, wherein in the image processing step, a movable character traveling in the game space and a driver character driving the movable character are collectively displayed as the first character, and a fellow passenger character riding on the movable character is displayed as the second character, in the first motion control step, traveling motions of the driver character and the movable character are changed, and in the second motion control step, the motion of the fellow passenger character is changed, and the traveling motion of the movable character is also changed based on the motion of the fellow passenger character.

18. The recording medium according to claim 17, wherein in the second motion control step, the fellow passenger character is operated so as to apply weight on the movable character, and the traveling direction of the movable character is changed based on the direction in which the fellow passenger character applies weight.

19. The recording medium according to claim 18, wherein in the first motion control step, the traveling direction of the movable character is changed, and the driver character is made to operate the movable character.

20. A computer-readable recording medium storing a game program that causes a computer included in a game apparatus operating a plurality of characters that appear in a game space to execute, in response to an operation of a controller performed by a player, a set of steps comprising:

an operation instruction receiving step of receiving operation data representing a game operation instruction inputted by the player from a controller; and an image processing step of generating a game image including image data of the characters in response to the operation data, wherein the image processing step comprises:

a first motion control step of controlling a motion of a first character appearing in the game space in response to a first operation instruction inputted by the player; and a second motion control step of controlling, in response to a second operation instruction that differs from the first operation instruction, a motion of a second character also appealing in the game space but different from the first character, and changing the motion of the first character based on the motion of the second character;

in the image processing step, a movable character traveling in the game space and a driver character driving the movable character are collectively displayed as the first character, and a fellow passenger character riding on the movable character is displayed as the second character;

in the first motion control step, motions of the driver character and the movable character are changed;

in the second motion control step, the motion of the fellow passenger character is changed, and the motion of the movable character is also changed based on the motion of the fellow passenger character; and the image processing step further comprises a character change step of changing roles of the characters set as the driver character and the fellow passenger character in response to a third operation instruction included in the operation data.

21. The recording medium according to claim 20, wherein in the second motion control step, a degree to which the motion of the movable character is changed based on the motion of the fellow passenger character in accordance with unique characteristics predetermined for the driver character and the fellow passenger character.

22. The recording medium according to claim 17, wherein in the operation instruction receiving step, first operation data including the first operation instruction is received from a first controller, and second operation data including the second operation instruction is received from a second controller, and the first and second controllers are operated by different players.

23. A computer-readable recording medium storing a game program that causes a computer included in a game apparatus operating a plurality of characters that appear in a game space to execute, in response to an operation of a controller performed by a player, a set of steps comprising:

an operation instruction receiving step of receiving operation data representing a game operation instruction inputted by the player from a controller; and an image processing step of generating a game image including image data of the characters in response to the operation data, wherein the image processing step comprises:

a first motion control step of controlling a motion of a first character appearing in the game space in response to a first operation instruction inputted by the player; and a second motion control step of controlling, in response to a second operation instruction that differs from the first operation instruction, a motion of a second character also appearing in the game space but different from the first character, and changing the motion of the first character based on the motion of the second character;

in the image processing step, a movable character traveling in the game space and a driver character driving the movable character are collectively displayed as the first character, and a fellow passenger character riding on the movable character is displayed as the second character;

in the first motion control step, motions of the driver character and the movable character are changed;

in the second motion control step, the motion of the fellow passenger character is changed, and the motion of the movable character is also changed based on the motion of the fellow passenger character;

in the operation instruction receiving step, first operation data including the first operation instruction is received from a first controller, and second operation data including the second operation instruction is received from a second controller, and the first and second controllers are operated by different players; and the image processing step further comprises a character change step of changing roles of the characters set as the driver character and the fellow passenger character with each other based on the first and/or second operation data.

24. The recording medium according to claim 23, wherein when the character change mechanism changes roles of the characters set as the driver character and the fellow passenger character,
in the first motion control step, the motion of the first character is controlled by the second operation data instead of the first operation data, and
in the second motion control step, the motion of the second character is controlled by the first operation data instead of the second operation data, and the motion of the first character is changed.

25. In a videogame in which a vehicle character is associated with (i) a driver character and (ii) a passenger character different than the driver character, a method of controlling game play of the videogame comprising:
receiving user input for controlling movement of the passenger character; and
controlling traveling movement of the vehicle character based at least in part on the movement of the passenger character.

26. In a videogame in which a vehicle character is associated with (i) a driver character and (ii) a passenger character different than the driver character, a method of controlling game play of the videogame comprising:
receiving user input for controlling movement of the passenger character; and
controlling movement of the vehicle character based at least in part on the movement of the passenger character;
wherein controlling the movement of the vehicle character based at least in part on the movement of the passenger character comprises controlling a traveling direction of movement of the vehicle character based at least in part on a movement by the passenger character which shifts the passenger character's weight.

27. The method of claim 25 further comprising receiving user input controlling movement of the driver character.

28. In a videogame in which a vehicle character is associated with (i) a driver character and (ii) a passenger character different than the driver character, a method of controlling game play of the videogame comprising:
receiving user input for controlling movement of the passenger character; and
receiving user input controlling movement of the driver character;
controlling movement of the vehicle character based at least in part on the movement of the passenger character;
wherein the user input controlling the movement of the passenger character and the user input controlling the movement of the driver character are received through a single user-operable controller.

29. The method of claim 27 wherein the user input controlling the movement of the passenger character and the user input controlling the movement of the driver character are received through different user-operable controllers.

30. The method of claim 25 further comprising changing roles of the passenger character and the driver character in response to received user input.

31. A machine readable medium having machine executable components for controlling gameplay in a videogame in which a vehicle character is associated with a vehicle driver character and a vehicle passenger character, the machine executable components comprising:
a vehicle driver character receiving component for receiving user input for controlling action of the vehicle driver character;
a vehicle passenger character receiving component for receiving user input for controlling action of the vehicle passenger character;
a vehicle character controlling component for controlling traveling movement of the vehicle character based on the received user input for controlling action of the vehicle driver character and the received user input for controlling the action of the vehicle passenger character; and
a display generating component for generating a display of the vehicle character, the vehicle driver character and the vehicle passenger character.

32. A machine readable medium having machine executable components for controlling gameplay in a videogame in which a vehicle character is associated with a vehicle driver character and a vehicle passenger character, the machine executable components comprising:
a vehicle driver character receiving component for receiving user input for controlling action of the vehicle driver character;
a vehicle passenger character receiving component for receiving user input for controlling action of the vehicle passenger character;
a vehicle character controlling component for controlling movement of the vehicle character based on the received user input for controlling action of the vehicle driver character and the received user input for controlling the action of the vehicle passenger character; and
a display generating component for generating a display of the vehicle character, the vehicle driver character and the vehicle passenger character
wherein the action of the vehicle passenger character includes moving the vehicle passenger character so as to shift the vehicle passenger character's weight in order to change the direction of movement of the vehicle character.

33. The machine readable medium of claim 31 wherein roles of the vehicle driver character and the vehicle passenger character are changeable to each other.

34. A game machine for operating a plurality of characters appearing in a game space, comprising:
a plurality of player-operable operation switches; and
an image processing mechanism executing a game program in response to operations performed on the operation switches to generate a game image including images based on image data of the plurality of characters, wherein
the image processing mechanism comprises:
a first motion control mechanism for controlling a traveling motion of a movable character appearing in the game space in response to an operation performed on a first operation switch included in the operation switches; and
a second motion control mechanism for causing, in response to an operation performed on a second operation switch included in the operation switches, a fellow passenger character also appearing in the game space and riding on the movable character to apply weight on the movable character, and changing the traveling motion of the movable character based on the direction in which the fellow passenger character applies weight.

35. In a videogame in which a vehicle character is associated with (i) a driver character and (ii) a passenger character different than the driver character, a method of controlling game play of the videogame comprising:
    receiving user input for controlling movement of the passenger character; and
    controlling movement of the vehicle character based at least in part on the movement of the passenger character;
    wherein controlling the movement of the vehicle character based at least in part on the movement of the passenger character comprises controlling a traveling direction of movement of the vehicle character based at least in part on a movement by the passenger character.

36. In a videogame in which a vehicle character is associated with (i) a driver character and (ii) a passenger character different than the driver character, a method of controlling game play of the videogame comprising:
    receiving user input for controlling action of the passenger character;
    receiving user input for controlling action of the driver character; and
    controlling a traveling direction of the vehicle character based on both the received user input for controlling action of the passenger character and the received user input for controlling the action of the driver character.

* * * * *